Dec. 6, 1960 C. W. CHASE ET AL 2,963,234

WEB SPLICING APPARATUS

Filed April 21, 1955 13 Sheets-Sheet 1

INVENTORS.
Corson Walter Chase
Walter J. Jasinowski
Arne V. Pedersen
By: Carlson, Pitzner, Hubbard & Wolfe
Attys.

Dec. 6, 1960 C. W. CHASE ET AL 2,963,234

WEB SPLICING APPARATUS

Filed April 21, 1955 13 Sheets-Sheet 2

INVENTORS.
Corson Walter Chase
Walter J. Jasinowski
Arne V. Pedersen
By: Carlson, Pitzner, Hubbard & Wolfe
Attys.

Dec. 6, 1960 C. W. CHASE ET AL 2,963,234

WEB SPLICING APPARATUS

Filed April 21, 1955 13 Sheets-Sheet 3

INVENTORS.
Corson Walter Chase
Walter J. Jasinowski
Arne V. Pedersen
By: Carlson, Pitzner, Hubbard & Wolfe Attys.

WEB SPLICING APPARATUS

Filed April 21, 1955

INVENTORS.
Corson Walter Chase
Walter J. Jasinowski
Arne V. Pedersen
By: Carlson, Pitzner, Hubbard & Wolfe
Attys.

WEB SPLICING APPARATUS

INVENTORS.
Corson Walter Chase
Walter J. Jasinowski
Arne V. Pedersen
By: Carlson, Pitzner, Hubbard & Wolfe
Attys.

WEB SPLICING APPARATUS

Filed April 21, 1955 13 Sheets-Sheet 6

INVENTORS.
Corson Walter Chase
Walter J. Jasinowski
Arne V. Pedersen
By: Carlson, Pitzner, Hubbard & Wolfe
Attys INVENTORS.
Corson Walter Chase
Walter J. Jasinowski
Arne V. Pedersen
By: Carlson, Pitzner, Hubbard & Wolfe
Attys.

Dec. 6, 1960 C. W. CHASE ET AL 2,963,234

WEB SPLICING APPARATUS

Filed April 21, 1955 13 Sheets-Sheet 8

INVENTORS.
Corson Walter Chase
Walter J. Jasinowski
Arne V. Pedersen
By: Carlson, Pitzner, Hubbard & Wolfe
Attys Dec. 6, 1960 C. W. CHASE ET AL 2,963,234

WEB SPLICING APPARATUS

Filed April 21, 1955 13 Sheets-Sheet 9

INVENTORS.
Corson Walter Chase
Walter J. Jasinowski
Arne V. Pedersen
By: Carlson, Pitzner, Hubbard & Wolfe
Attys.

Dec. 6, 1960 C. W. CHASE ET AL 2,963,234

WEB SPLICING APPARATUS

Filed April 21, 1955 13 Sheets-Sheet 10

INVENTORS.
Corson Walter Chase
Walter J. Jasinowski
Arne V. Pedersen
By: Carlson, Pitzner, Hubbard & Wolfe
Attys.

INVENTORS.
Corson Walter Chase
Walter J. Jasinowski
Arne V. Pedersen
By: Carlson, Pitzner, Hubbard & Wolfe
Attys.

INVENTORS.
Corson Walter Chase
Walter J. Jasinowski
Arne V. Pedersen
By: Carlson, Pitzner, Hubbard & Wolfe
Attys WEB SPLICING APPARATUS
Filed April 21, 1955
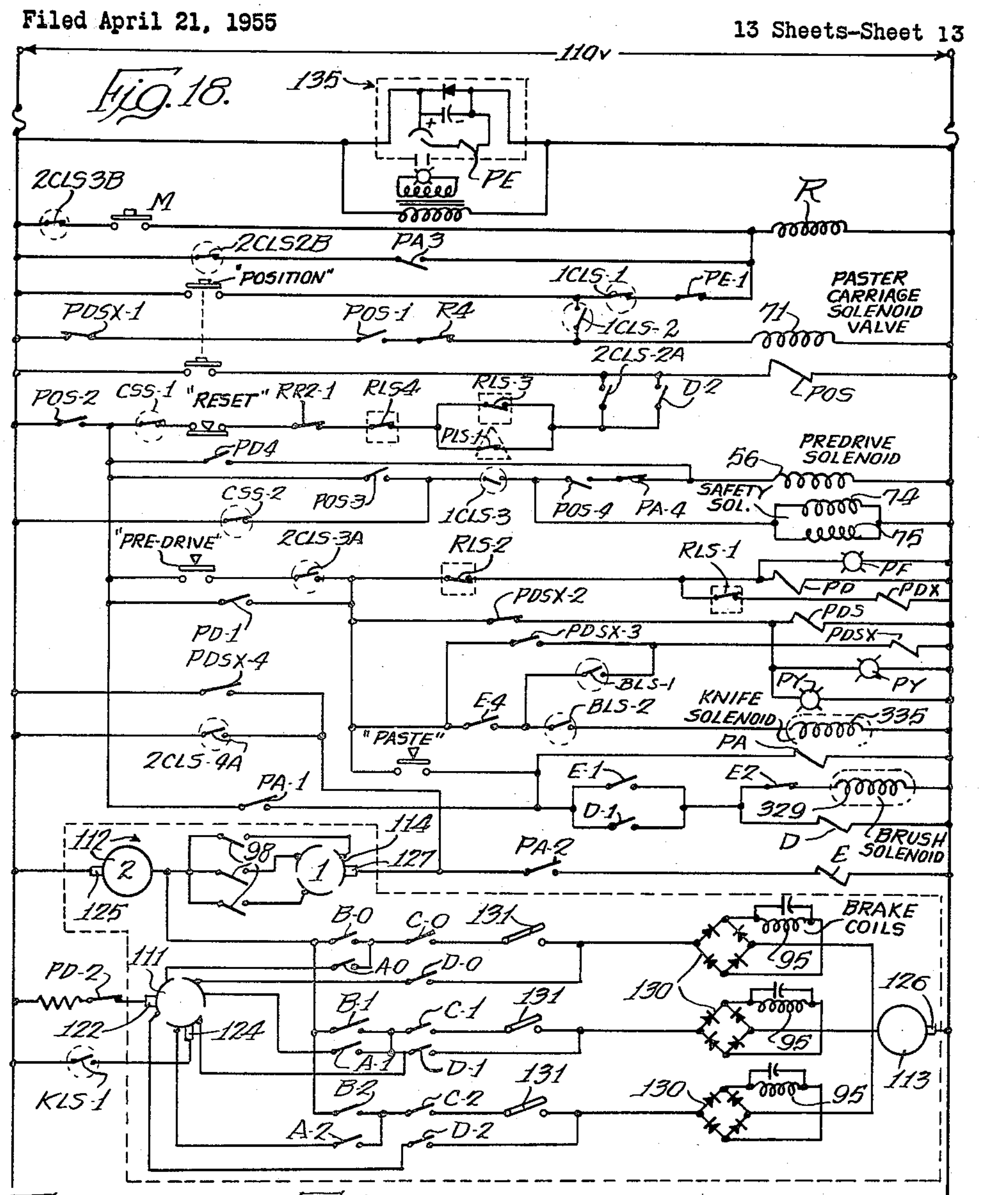
Fig. 18.
Fig. 19. 440 volts 3φ
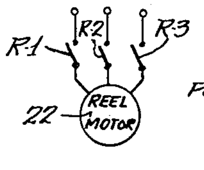
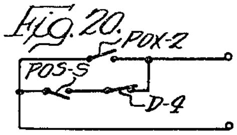
Fig. 20.
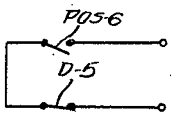
Fig. 21.
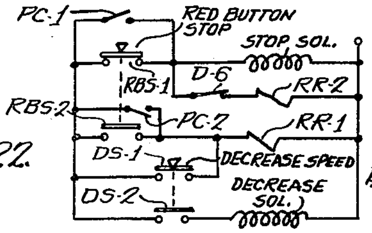
Fig. 22.
INVENTORS.
Corson Walter Chase
Walter J. Jasinowski
Arne V. Pedersen
By: Carlson, Pitzner, Hubbard & Wolfe
Attys

United States Patent Office 2,963,234

Patented Dec. 6, 1960

2,963,234

WEB SPLICING APPARATUS

Corson Walter Chase, Oak Park, Walter J. Jasinowski, La Grange Park, and Arne V. Pedersen, Des Plaines, Ill., assignors to Miehle-Goss-Dexter, Incorporated, Wilmington, Del., a corporation of Delaware

Filed Apr. 21, 1955, Ser. No. 502,923

28 Claims. (Cl. 242—58.3)

The present invention relates in general to web splicing apparatus and, more particularly, to such apparatus for splicing a new paper web roll to a web running into a newspaper press or the like without interrupting the operation of the latter.

It is the general aim of the invention to create improved web splicing apparatus of the foregoing type which is substantially automatic and reliable in its sequential operations, substantially eliminating the chances of web breakage with consequent stoppage of the press, damage to the apparatus itself, or injury to workmen through human errors.

More specifically, it is an object of the invention to provide web splicing apparatus in which the movements and operations of all components are so controlled that each proceeds only in response to a movement or operation of another, so that no error can result once the splicing cycle has begun.

Another object is to smooth the pick-up of the new roll web and minimize the chances of web breakage by not only rotating the new roll before the splice is made, but also accurately matching its peripheral speed to the speed of the running web through the use of control components responsive to those two speeds.

It is a further object to regulate precisely the braking force on the new roll, applied immediately after splicing, thus to maintain transition tension in the web at a predetermined value. A related object is to control such transition braking or tension in accordance with the manually adjusted tension maintained in the web under normal operating circumstances.

It is still another object to simplify the apparatus by employing a single motor for the dual purposes of predriving the new roll before the splice is made, and regeneratively braking the new roll after the splice is made to create transition tension.

Another object is to provide uniform web tension throughout the splicing cycle by improved means for gradually reducing the transitional braking on the new roll as it is moved into engagement with web tensioning means such as stationary belts.

An additional object of the invention is to cause the braking force on a new roll and the transition web tension to be automatically changed to a predetermined value when the press is stopped or its speed is decreased, thereby preventing overrun of the new roll and a loose loop in the web.

Still another object is to prevent rotation of the reel which supports web rolls beyond a predetermined position when the predrive carriage and belt are lowered, thus preventing the latter from being "trapped" by an advancing newly loaded roll.

Another object of the invention is to phase accurately the actuation of deflecting means which press the running web against the new roll, and the actuation of knives which sever the old web from the expiring roll, with reference to the adhesive-coated leading edge of the new roll web by controlling the actuation of both from a single set of electrical contacts which are opened and closed by a cam rotating with the new roll itself.

It is also an object of the invention to provide fluid pressure means for moving a paster carriage between its retracted and operative positions together with control means therefor which stop retraction of the carriage if any object is disposed in its retraction path. A related object is to provide a positive latch for maintaining the paster carriage in its retracted position even though there should be a failure of fluid pressure, together with means for releasing the latch when the carriage is to be lowered toward splicing position.

It is also an object of the invention to enhance the ease with which the splicing apparatus may be employed for webs of different widths through the provision of a simplifie darrangement for adjusting the bias in springs which urge the brushes against the running web.

Still another object is to eliminate wrinkling of the web, with the attendant possibility of rupturing it, when the brushes deflect it against the new roll by deflecting tension belts which the brushes straddle at the same time that the brushes contact the running web.

It is also an object to simplify the fastening of brushes and knives to rotatable shafts while at the same time accurately phasing those elements on their shafts.

It is a further object to increase the safety with which the web splicing apparatus operates by a control arrangement which requires that the operator hold a switch closed until the cycle has progressed to a predetermined point, all of the components being returned to their original retracted positions if the operator releases such switch.

The invention also contemplates the provision of brakes for roll-supporting spindles together with improved control means for energizing such brakes according to the angular position of a particular roll.

Other objects and advantages will become apparent as the following description proceeds, taken in conjunction with the accompanying drawings, in which.

Figures 2, 2A:
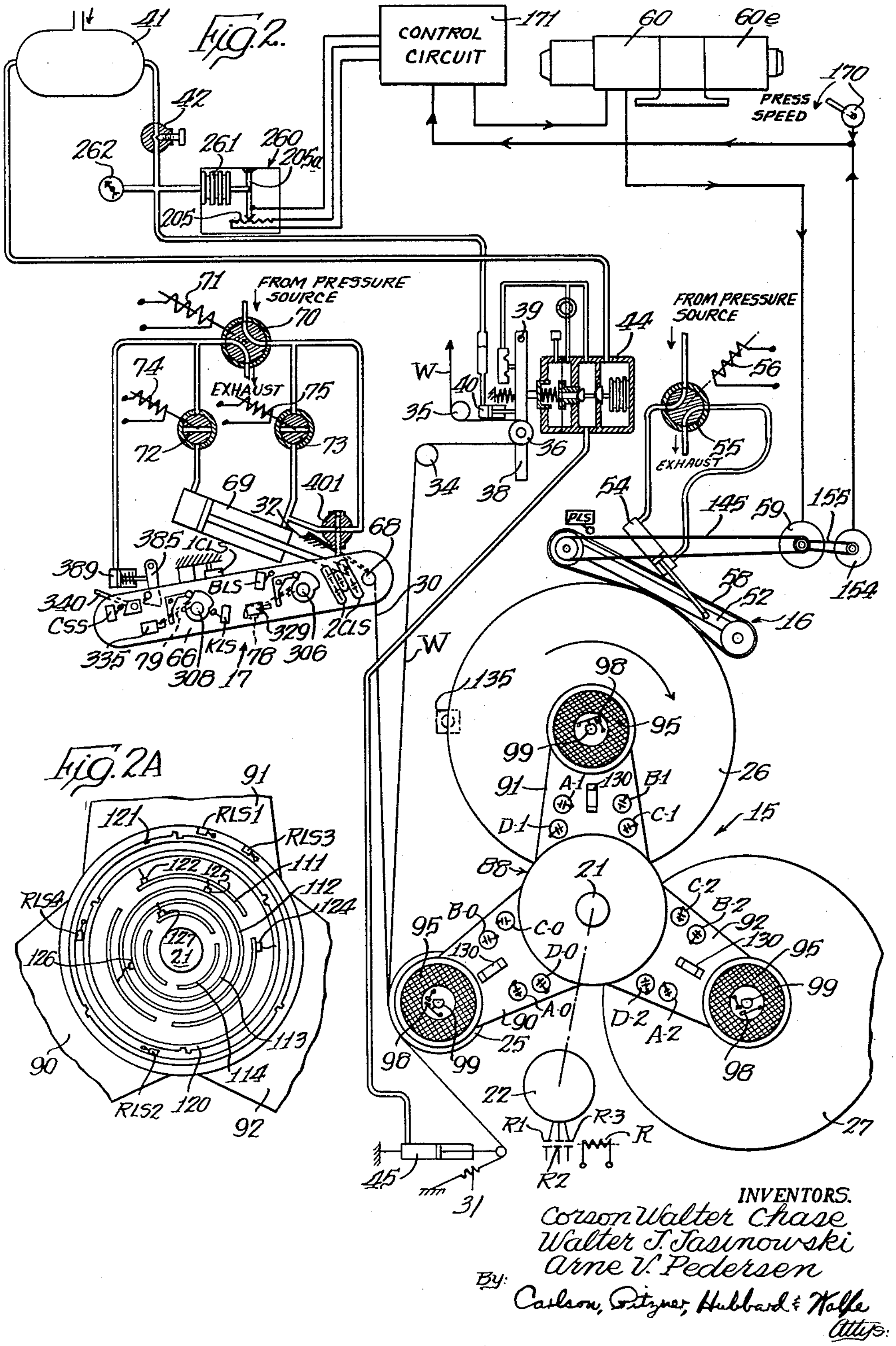
Fig. 2 is a schematic diagram which is partially mechanical, electrical and pneumatic in form, illustrating the overall organization of the apparatus.
Figure 3:
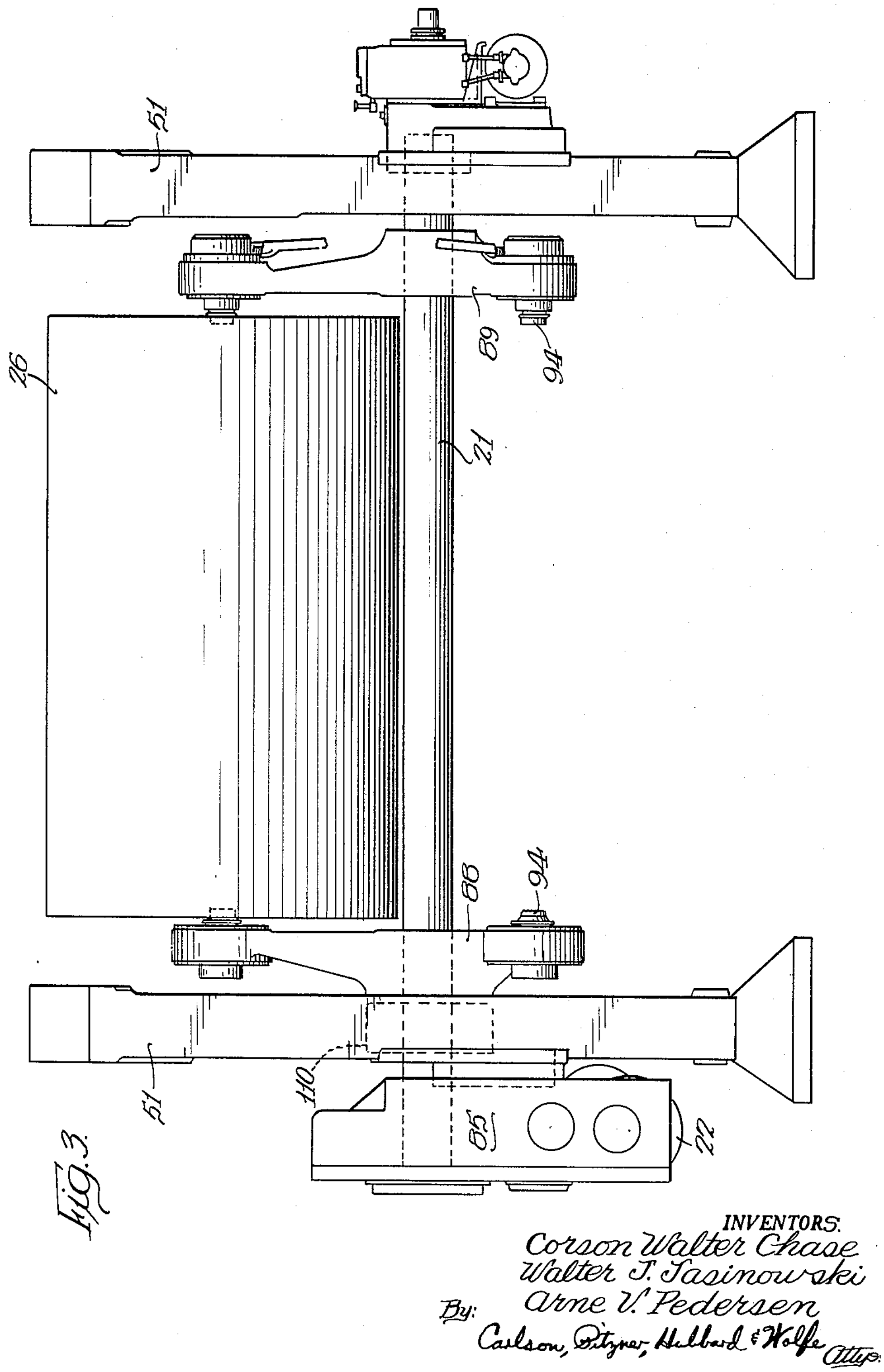
Figures 4, 5:
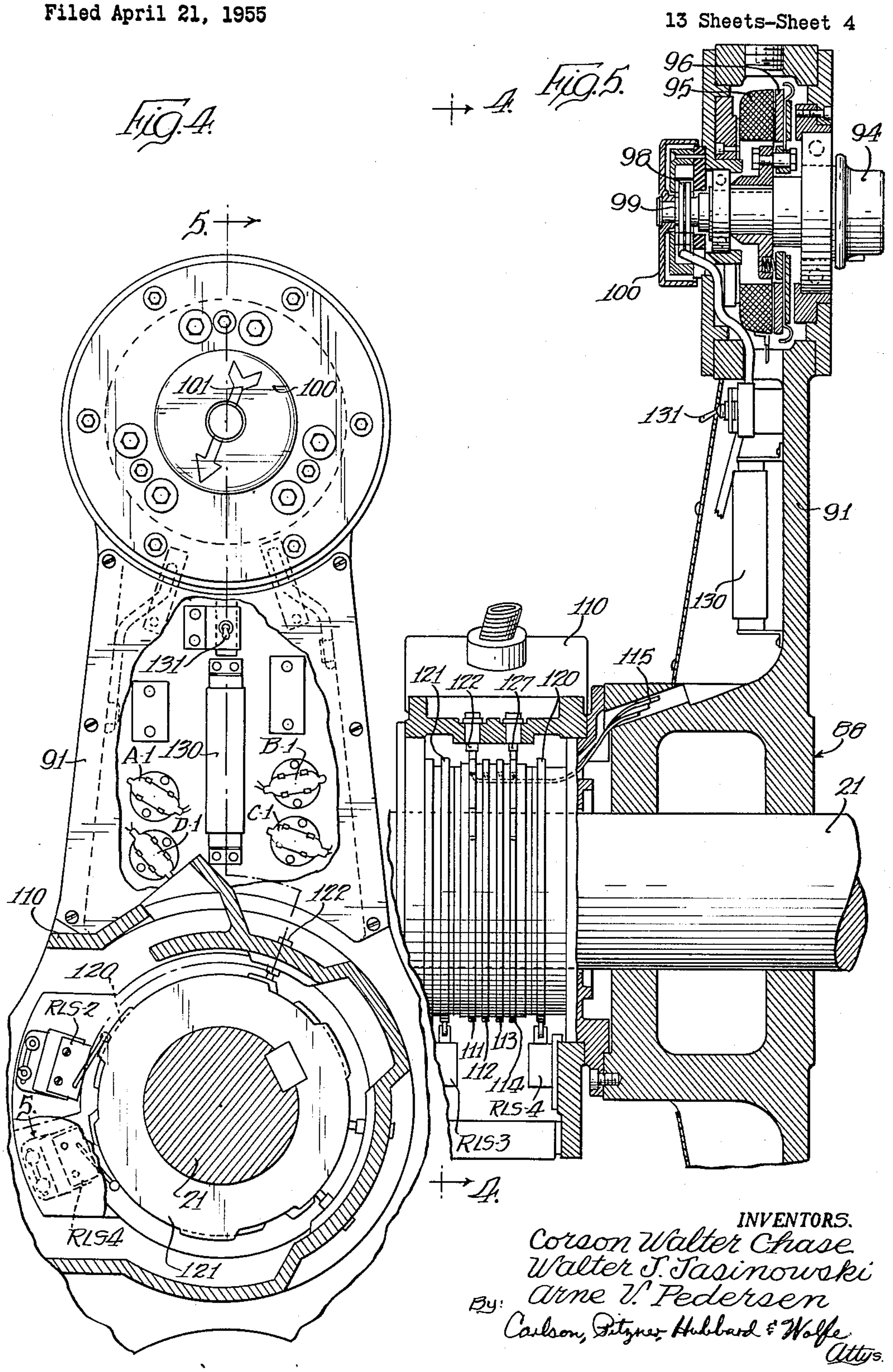
Figure 6:
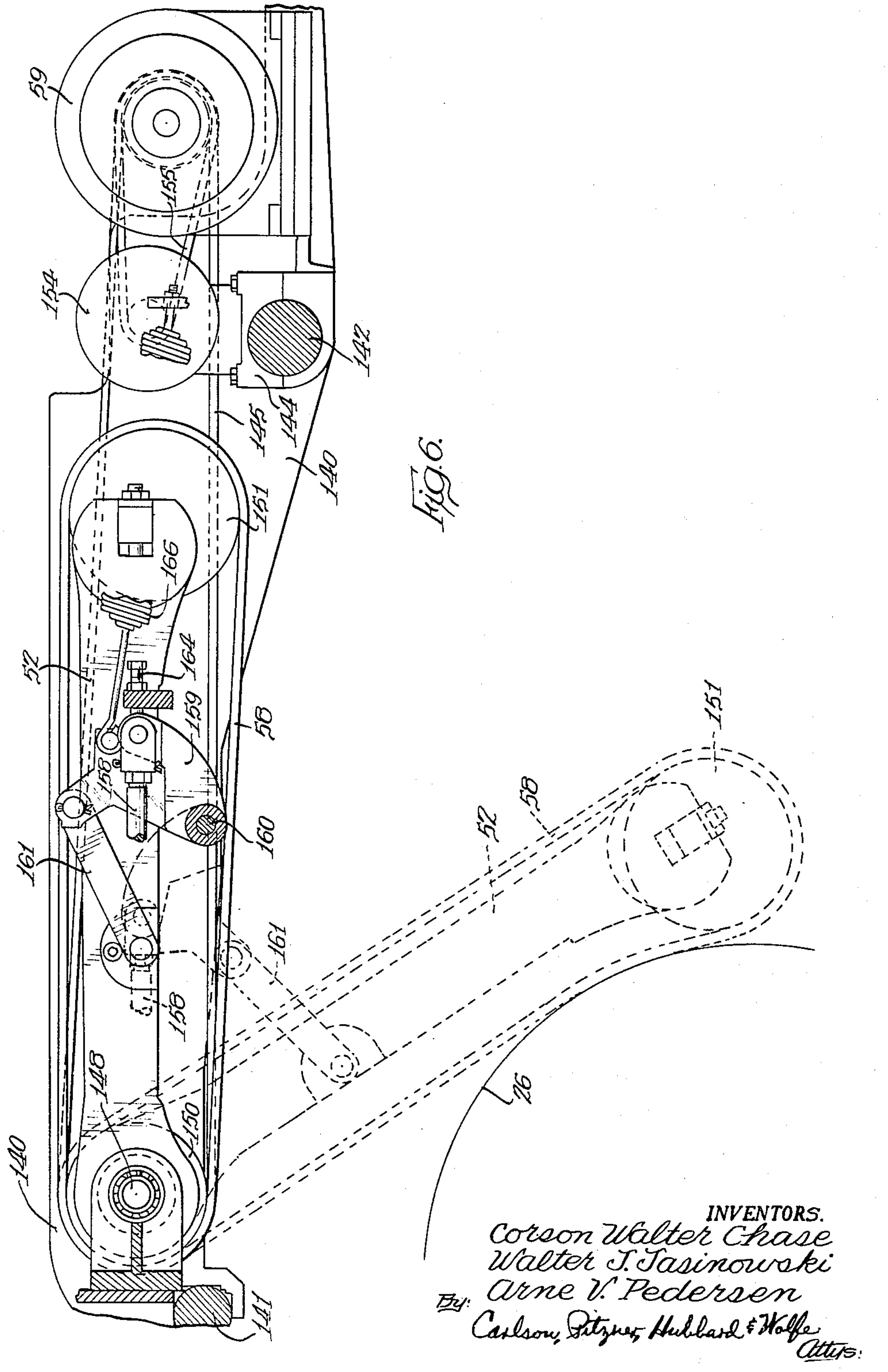
Figure 7:
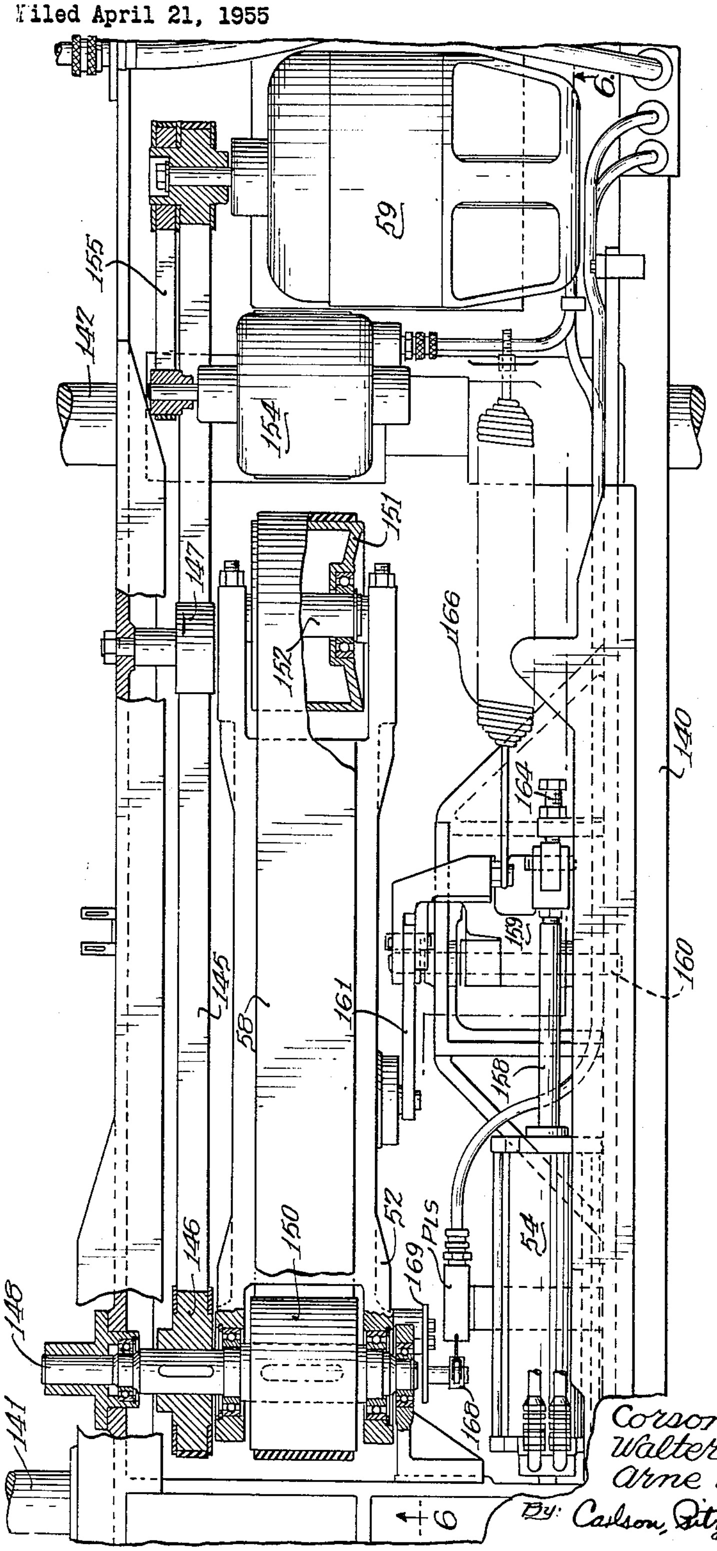
Figure 6:
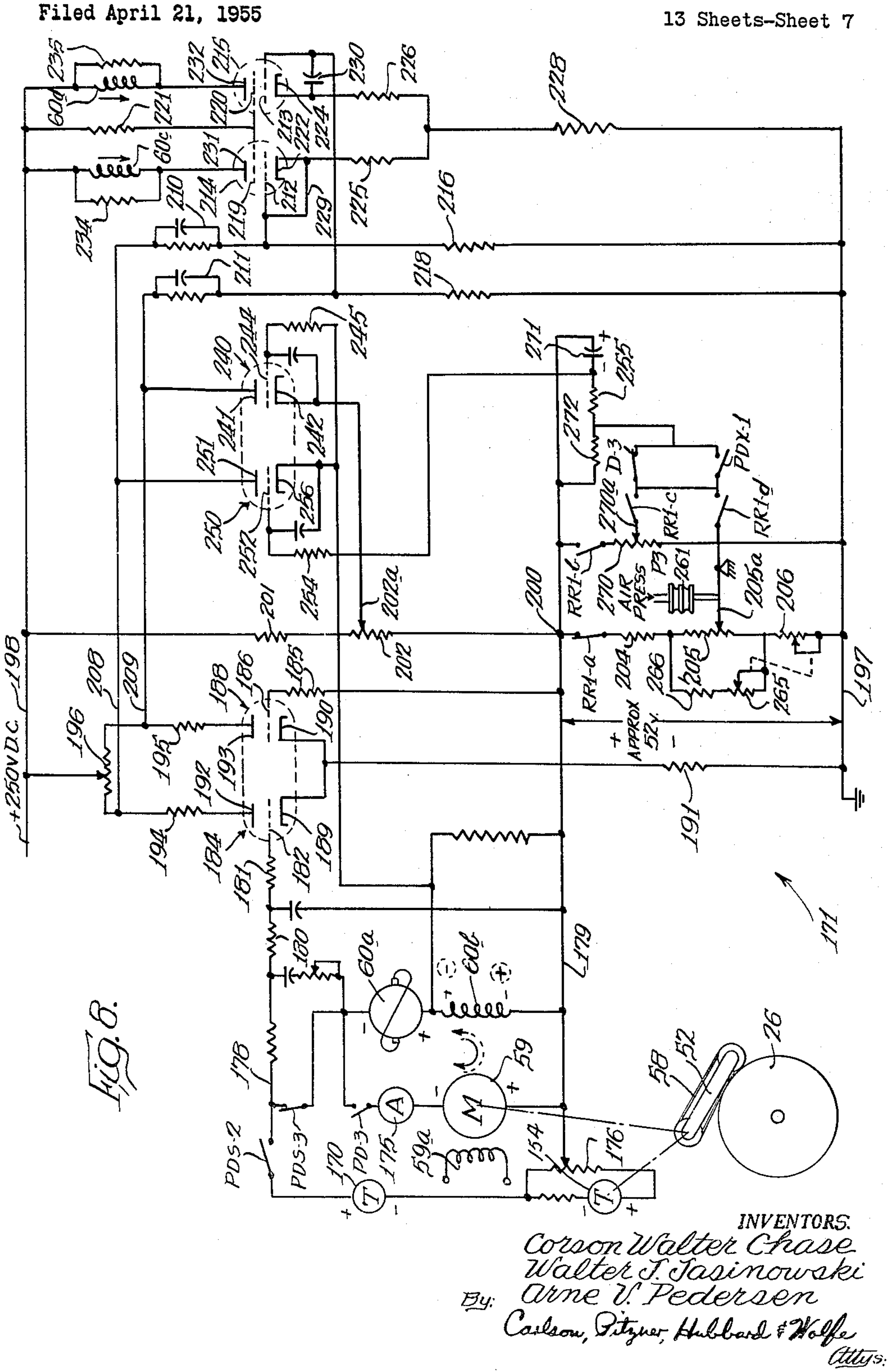
Figure 9:
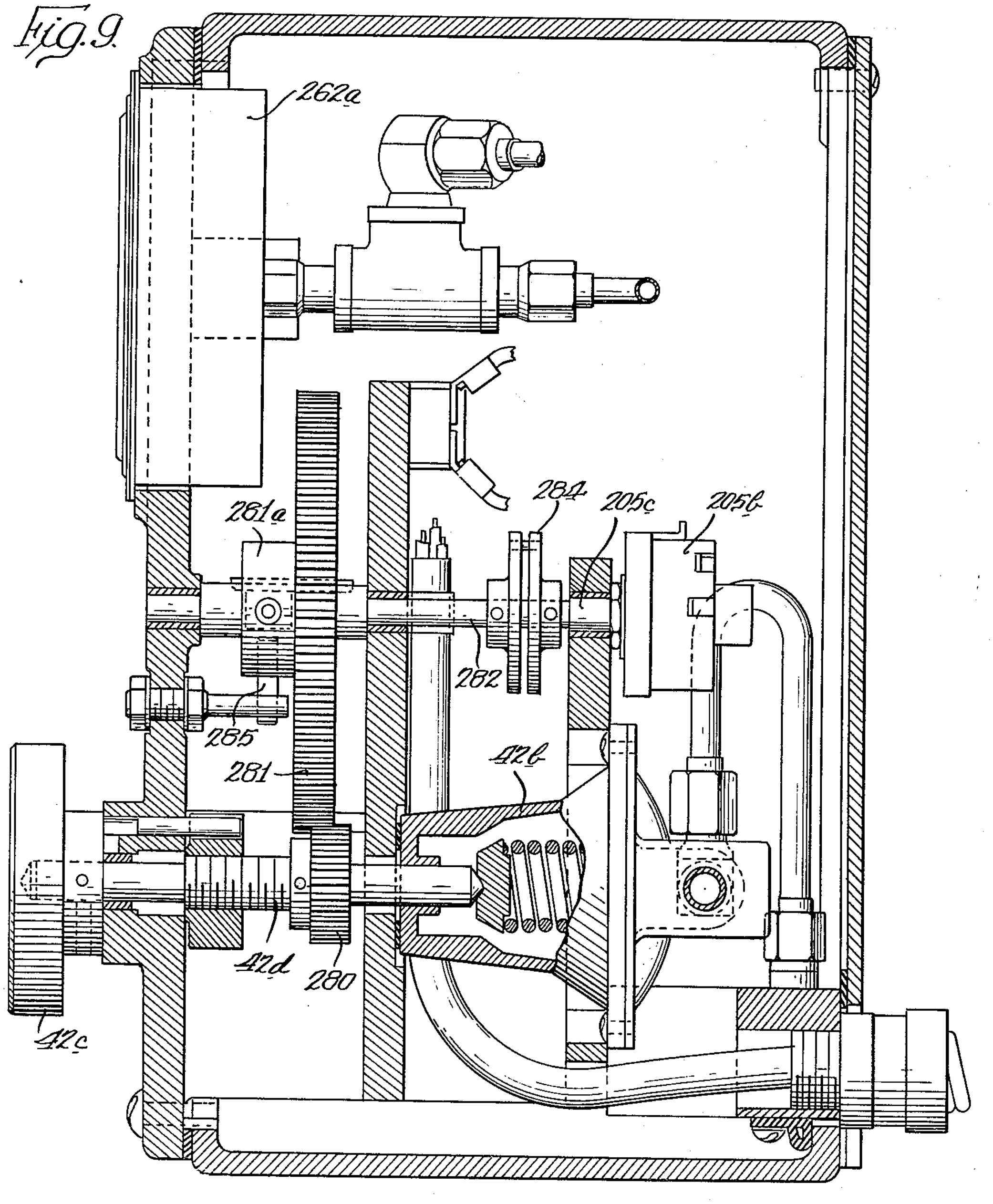
Figures 10, 10A:
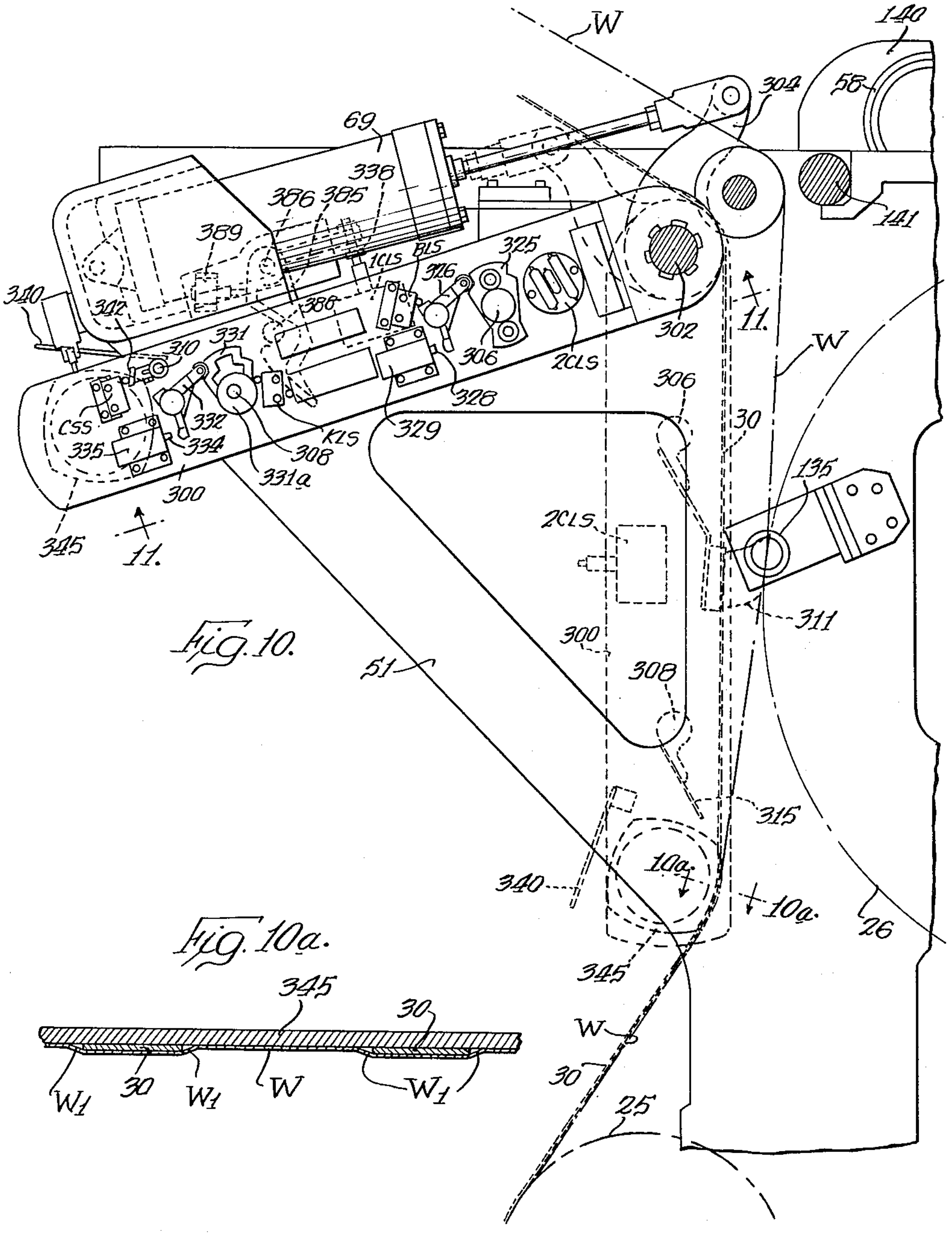
Figure 11:
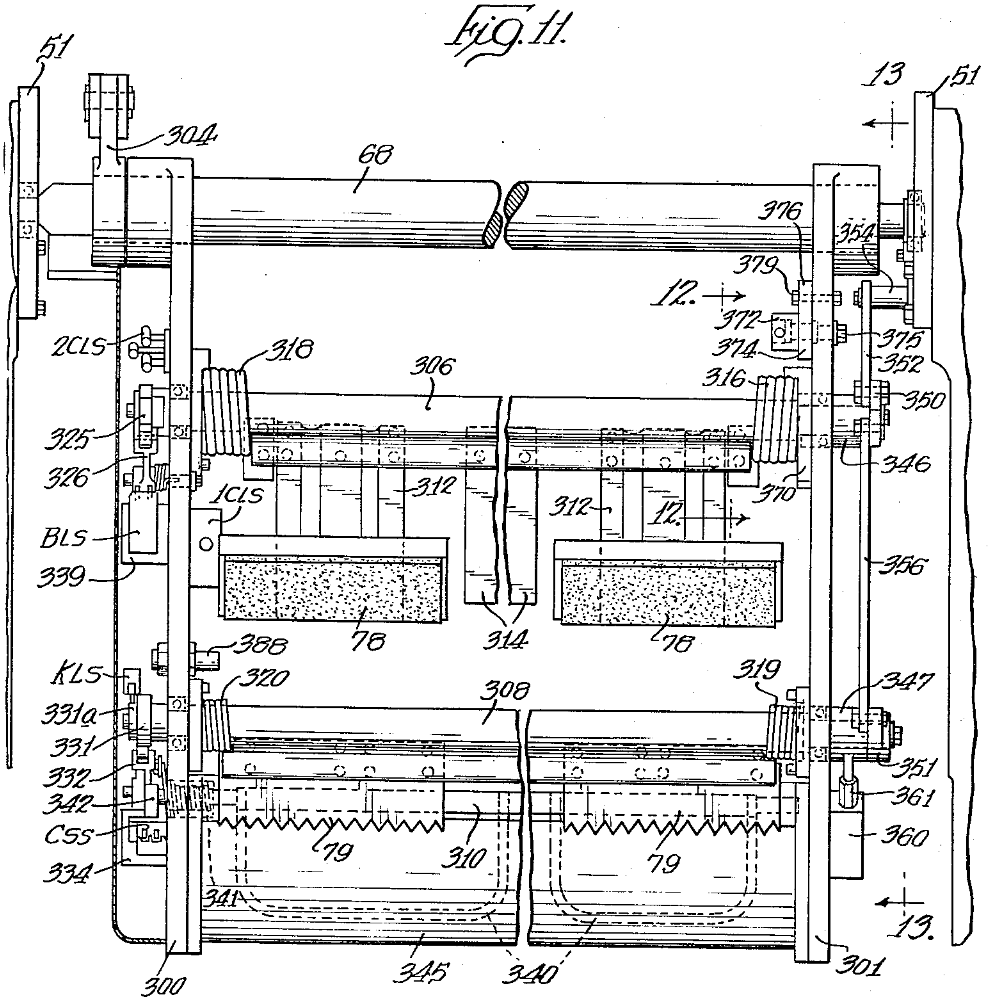
Figures 12, 13:
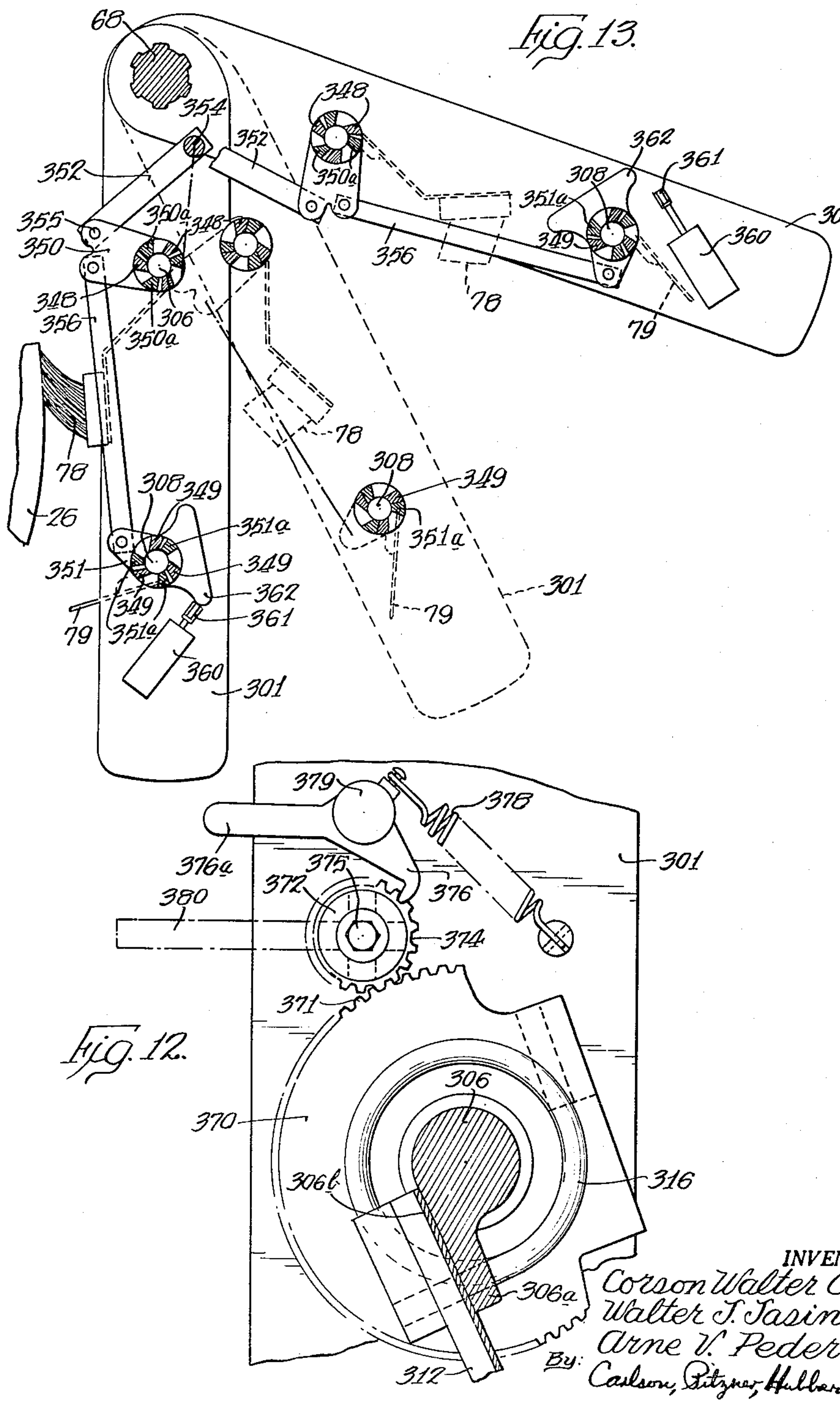

Fig. 2*a* is a fragmentary schematic representation of electrical components controlled according to the rotational position of the reel shaft shown in Fig. 2;

Fig. 3 is a front elevation of the reel assembly and its supports;

Fig. 4 is an end elevation of one arm of a reel spider, shown partly in section taken substantially along the line 4—4 in Fig. 5;

Fig. 5 is a sectional view of a spider arm and the slip ring assembly, taken substantially along the line 5—5 in Fig. 4;

Fig. 6 is a sectional view of the predrive assembly and carriage, taken substantially along the line 6—6 in Fig. 7;

Fig. 7 is a plan view of the predrive assembly;

Fig. 8 is a schematic diagram of the control circuit for the predrive and transition tension functions;

Fig. 9 is a sectional view of an alternative arrangement for causing the transition web tension to equal the tension provided by the regular tension system;

Fig. 10 is a side elevation of the paster carriage assembly;

Fig. 10*a* is a detail sectional view taken substantially along the line 10*a*—10*a* in Fig. 10;

Fig. 11 is a bottom view of the paster carriage looking substantially along the line 11—11 in Fig. 10;

Fig. 12 is a detail view, taken substantially along the line 12—12 in Fig. 11, of the brush pressure adjustment mechanism;

Fig. 13 is a side elevation of the paster carriage, partially in section taken substantially along the line 13—13 in Fig. 11 and illustrating the brush and knife cocking mechanism;

Figs. 14–17 are schematic illustrations of the fluid pressure means and controls for moving the paster carriage between retracted and operative positions;

Fig. 18 is a schematic line-to-line circuit diagram of the electrical controls for accomplishing sequential operation or movement of the several parts; and Figs. 19–22 are schematic diagrams of auxiliary circuits.

While the invention has been shown and is described in some detail with reference to a particular embodiment thereof, there is no intention thus to limit it to such details. On the contrary, the intention here is to cover all modifications, alterations, and equivalents falling within the spirit and scope of the invention as defined by the appended claims.

*General organization*

Figure 1:
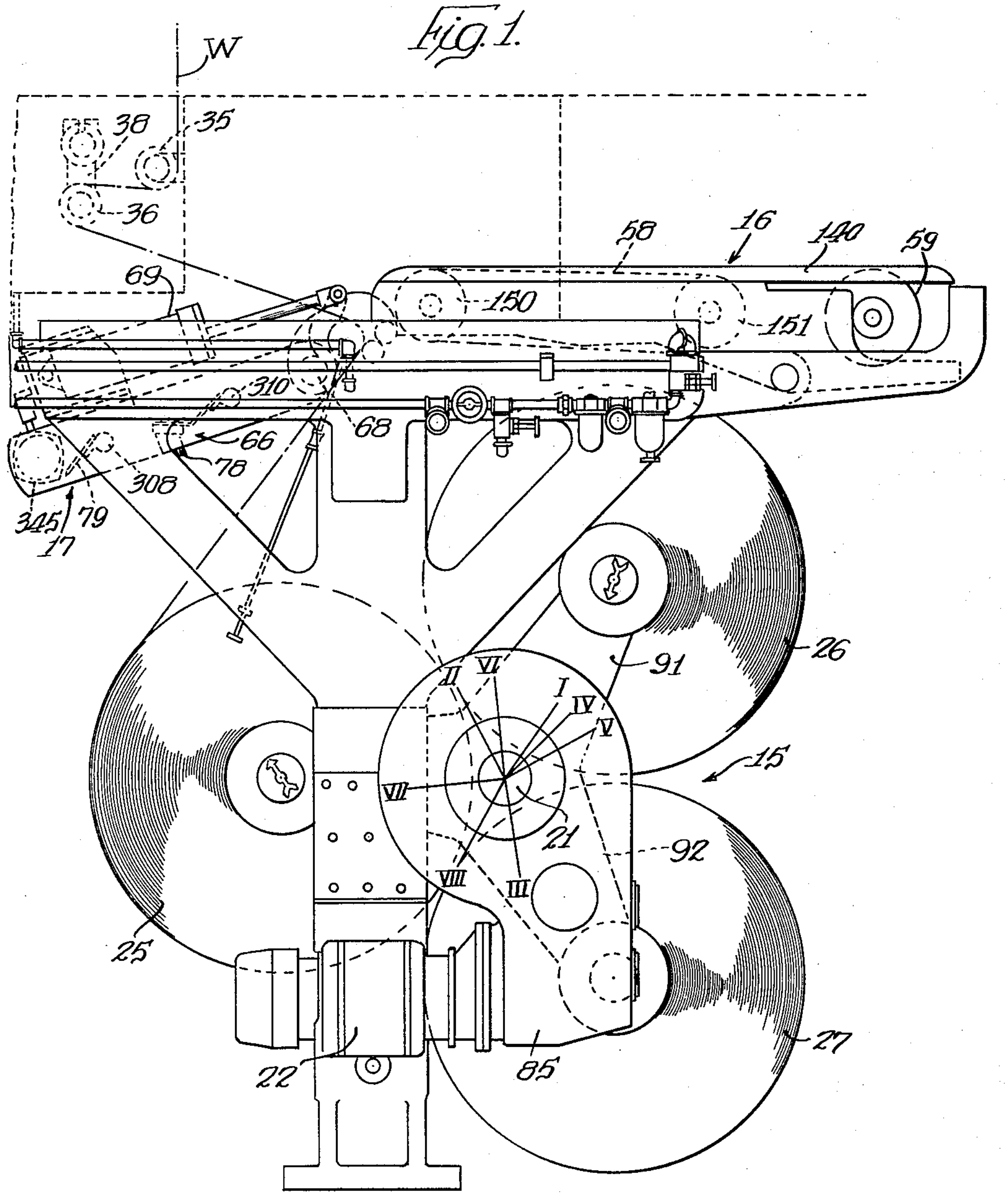
Figure 1 is a side elevation of web splicing apparatus embodying the features of the invention.

The apparatus here illustrated by way of example is intended to effect substantially automatic and fool-proof splicing of paper webs wound in rolls and drawn at high speeds into a newspaper press. As one roll expires, the web is spliced to a new roll and then severed from the old roll all without stoppage of the press. In general, the apparatus includes a movable support for paper rolls, here shown as a reel assembly 15, located beneath a predrive assembly 16 on one side and a paster carriage assembly 17 on the other side (Figs. 1 and 2). Axially spaced on a reel shaft 21, which may be turned by a suitable electric motor 22, are spiders having radial arms which rotatably support three web rolls 25, 26, 27. The running web W is drawn from the expiring roll 25 upwardly into the press (not shown) at a speed dependent upon the press speed.

An adjustable automatic system tensions the web W. This is preferably of the pneumatic type disclosed and claimed in the copending McWhorter U.S. application, Serial No. 335,762, filed February 9, 1953 (now Patent No. 2,743,881) to which reference may be made for a more detailed description.

Briefly, the automatic tensioning system includes stationary tension belts 30 fixed to springs 31 at their lower ends and extending upwardly to anchor points 32 so that they partially wrap and frictionally engage the periphery of the expiring roll 25. The web W passes between spaced rollers 34, 35 and over a floating roller 36 carried by a depending arm 38 pivoted at 39. The arm 38 is balanced between a loading cylinder 40 supplied with air pressure from a reservoir 41 through a pressure regulating valve 42. On the opposite side of the arm 38 is a pressure-loaded valve 44 supplied with air pressure from the reservoir and connected upon movement of its plunger to control the pressure supplied to a pneumatic actuator or ram 45 engaged with the lower end of the tension belts 30.

As tension in the web W increases or decreases, the arm 38 is rocked about its pivot 39, thereby shifting the plunger of the valve 44 so that the ram 45 increases or decreases the pressure of the belts. The frictional drag of the belts 30 on the roll 25 is thus automatically increased or decreased to restore the tension in the web W to its original value. That value may be adjusted manually by setting the pressure regulator 42.

The predrive assembly 16 is mounted on the upper portions of Y-shaped supports 51 which also carry the reel shaft 21. The assembly includes a carriage 52 movable or pivotable between a retracted position (permitting clearance for a roll as the reel rotates) and an operative position (permitting the new roll to be either driven or braked). Such movement is caused by a double-acting pneumatic actuator 54 under the control of a four-way valve 55 shifted between its two positions in response to energization or deenergization of a solenoid 56. The carriage 52 supports an endless belt 58 which may thus be brought into frictional driving engagement with the new roll 26 so that the latter is brought up to speed before the splice to the running web is made. The belt 58 is driven or retarded by a motor 59 controlled in a particularly advantageous manner by means including an amplidyne 60. As explained more fully below, the control means, on the one hand, cause the motor 59 and predrive belt 58 to bring the new roll up to a speed matching the web speed by comparing two speed signals prior to a splice; and, on the other hand, to retard the new roll by regenerative braking after the splice is made in order to maintain web tension before the new roll is brought into operative engagement with the tension belt 30 of the automatic tensioning system. The carriage 52 is raised and lowered to and from its retracted and operative positions automatically to permit the newly loaded roll 27 to clear it as the reel rotates.

It will be understood that prior to a splice, the leading edge of the new roll 26 is coated with a suitable adhesive paste or glue which remains tacky. A discontinuity is left in the adhesive where the predrive belt 58 engages the roll. The paster carriage assembly 17 functions to deflect the running web W against the properly positioned new roll 26 in order to bond the web to the leading edge of the new roll, and to sever the old web from the expiring roll 25. This assembly includes a carriage 66 pivoted to rock between retracted and operative positions about a support shaft 68 under the influence of a double-acting pressure fluid (pneumatic) actuator or ram 69 controlled by a four-way solenoid valve 70 moved between its two positions in response to energization of a solenoid 71. Also connected in the pneumatic circuit are two safety valves 72, 73 movable between their two positions in response to energization of solenoid coils 74 and 75.

Supported on the paster carriage 66 are a plurality of brushes 78 cocked against spring biasing means and retained by a latch. With the carriage lowered, release of the latch permits the brushes 78 to swing outwardly and deflect the web W against the rotating new roll 26. This, in turn, causes the web to adhere to the paste on the new roll. Also supported on the paster carriage and actuated shortly after the brushes, are a plurality of knives 79 cocked against spring means and retained by a latch. When the latch is released, the knives swing to sever the web W at a point beneath the brushes so that the expiring roll web is broken.

*Reel assembly*

Referring more particularly to Figs. 2–5, it will be seen that the main reel shaft 21 is rotatably held in the vertical, Y-shaped supports 51. The reel motor 22 is drivingly connected through a suitable speed-reducing gear box 85 and energized through contacts R–1, R–2, and R–3 closed upon energization of a coil R to rotate the shaft 21 counterclockwise as viewed in Fig. 2.

Two spiders 88, 89 are rotatable with the shaft 21, each having three radial arms 90, 91, 92 at 120° intervals. In each radial arm are journaled spindles 94 on which the rolls are chucked. Magnetic brakes in the spider 88 are operative on the spindles, having stationary field coils 95 which, when energized, attract armatures 96. These coils 95 are energized as explained below. Also located in each arm of the spider 88 is a single set of breaker contacts or points 98 opened and closed by a cam 99 which rotates with the spindle. Each spindle also carries an external knob 100 marked with suitable indicia such as an arrow 101. The trailing edge of the glue or paste pattern is applied to a new roll at the peripheral location to which the arrow points. This assures that the cam 99 opens and closes the breaker points 98 in properly timed relation to the angular position of the pasted leading edge as the new roll is rotated prior to a splice.

For energizing the magnetic brake coils 95 at the proper times as the reel rotates, and to give external connection to the breaker points 98, a stationary slip ring housing 110 is disposed around the shaft 21. A plurality of slip rings 111 are mounted in insulating material to rotate with the shaft and connected by wiring 115 leading out through the radial arms to the several breaker points and brake coils. Stationary within the housing 110 and connected into external electrical circuits are four reel limit switches RLS1–RLS4 controlled according to the angular position of the reel shaft 21. The switches have followers engaging a pair of circular cams 120, 121 rotated with the reel shaft 21.

As shown best in Figs. 2*a*, the rings 111, 114 are divided into three electrically separate segments extending through an arc of slightly less than 120°. Carried in the housing 110 and riding in electrical contact with different segments of the ring 111 are a pair of brushes 122, 124. Similarly, brushes 125, 126 and 127 ride in electrical contact with the three slip rings 112, 113, and 114, respectively. These brushes are connected into electrical circuits as more fully described below.

The limit switches RLS1 and RLS3 are controlled by the cam 121, while the switches RLS2 and RLS4 are controlled by the cam 120. All are normally held closed. As seen in Fig. 2*a*, each of the cams 120, 121 is formed with a circular surface having adjacent raised and grooved portions at three locations spaced at 120°. Thus, the switches RLS1 and RLS2, which open when their followers drop into cam grooves, open once each time one of the spider arms passes through a given angular position. The same is true of the limit switches RLS3 and RLS4 which open each time that their followers are lifted by a raised cam portion.

Each of the arms 90—92 on the spider 88 carries a rectifier 130 for supplying direct current to the respective brake coils 95. Toggle switches 131 permit the brake coil circuits to be manually opened irrespective of the positions of the other switches in the brake coil circuit. By opening a switch 131 a newly loaded roll carried by the corresponding spindle may be turned for convenient application of the glue pattern. Then the roll may be turned to locate the glue or paste on its underside to avoid contamination by falling dirt or foreign matter before that roll is moved into the pre-paste position. Moreover, just before the pasting cycle begins, the switch 131 for the new roll may be opened and that roll turned so that the glue pattern will be adjacent the running web as it reaches pre-paste position. In case the new roll is not perfectly round, and the glue pattern happens to be at the point of greatest radius, the photoelectric cell 135 automatically spaces the glue pattern from the running web W so that a premature splice (before the brushes act) cannot result when predriving begins.

For controlling the energization of the brake coils according to the angular zone of their particular spider arms, each arm is equipped with a plurality of gravity-operated switches, here shown as mercury bottles carried in clips. These clips may be initially angularly adjusted so that each of the switches opens or closes at a given angular position. The arm 90, which is shown in Fig. 2 as supporting the expiring roll 25 has four such switches identified, respectively, as A–0, B–0, C–0 and D–0. Similarly, the arm 91 carries mercury switches A–1 through D–1, and the arm 92 carries mercury switches A–2 through D–2. As explained below, these mercury switches coact with the slip ring, brushes, and other circuit components to automatically send current to the brake windings 95 so that the spindles 94 are braked at the proper times. The spindles in this manner are locked when their arms are in position for reloading (the position of arm 92 in Fig. 2*a*), unlocked if supporting the new roll at the time that the predrive belt 58 begins to bring it up to speed, and are subsequently locked again when their arms support the expiring roll after the expiring web has been severed.

At the time a splice is to be made, the reel 20 is set in rotation to bring the new roll to a substantially top vertical position as shown in Fig. 2. To assure that the new roll will be stopped in close proximity (about ¾ inch) to the running web W, the photoelectric cell 135 of a photorelay is mounted on one of the frames 51, with a light beam source mounted on the opposite frame. When the periphery of the new roll 26 breaks the light beam, the reel driving motor 22 is automatically deenergized to halt reel rotation. The circuitry for this photoelectric control will be taken up in more detail at a later point.

*Predrive assembly*

With more particular reference to Figs. 2, 6 and 7, the predrive assembly includes a frame 140 which is mounted at the upper ends of the supports 51 on two cross bars 141, 142. A clamp 144 may be loosened to permit adjustment of the frame axially along the bars, thereby setting the axial location at which the predrive belt engages the new roll periphery. The predrive motor 59 is mounted at one end of the frame 140 (Fig. 7), and connected by drive means such as a toothed belt 145 with a toothed pulley 146 keyed to a shaft 148 journaled by suitable bearings at the opposite end of the frame. Intermediate support for the belt is given by an idler 147. Also supported by bearings on the shaft 148 is the bifurcated end of the predrive carriage 52, a pulley 150 being keyed to the shaft between the bearings for the carriage. The predrive belt 58, in turn, is trained over the pulley 150 and a second pulley 151 journaled on a cross shaft 152 at the opposite bifurcated end of the carriage. Mounted adjacent the motor 59 is a speed sensing device, here a tachometer generator 154 which is also driven from the motor shaft by a short connecting belt 155. The tachometer gives an electrical signal or voltage proportional to the speed of the motor, and thus proportional to the peripheral speed of the new roll.

To rock the carriage 52 and the belt 58 between their upper, retracted and their lower, operative positions, the double-acting ram 54 is suitably fastened to the frame 140 with its piston rod 158 connected to a lever 159 pivoted on a stub shaft 160. The lever, in turn is connected by a pivoted link 161 to the belt carriage 52. As the piston rod 158 is retracted, it rocks the lever counterclockwise about the shaft 160, permitting the belt carriage 52 to descend to the operative position shown by dashed lines. The upper position of the carriage 52 may be adjusted by a stop bolt 164 engaged by the extended piston rod. A tension spring 166 may be connected between the lever 159 and the frame in order to aid in returning the carriage 52 to its retracted position as the piston rod 158 is extended.

To prevent the lowered carriage from being "trapped" as the newly loaded roll advances after a splice is made, a limit switch PLS is also mounted on the frame 140 with its follower riding on an eccentric cam 168 fixed by a bracket 169 (Fig. 7) to the carriage 52 to swing with the carriage about the axis of the shaft 148. The switch is thus opened only when the predrive carriage 52 is lowered from its retracted position.

As explained previously with reference to Fig. 2, the double-acting ram 54 is supplied with pressure fluid or exhausted according to the setting of the four-way valve 55 under the control of the solenoid 56. When the solenoid is deenergized, the valve 55 is in that position which causes the carriage 52 to be retracted.

In keeping with one important feature of the invention, the predrive motor 59 and the predrive belt 58 serve two important functions. First, they drive the new roll and maintain its peripheral speed substantially equal to the speed of the running web W before the splice is made. Secondly, after the splice is made, they transitionally brake or retard the new roll to create a predetermined tension in the new web before the new roll advances into engagement with the tension belts.

*The predrive controls*

The predrive controls are best shown in Figs. 2 and 8. As shown in Fig. 2, a second speed-responsive device, here a tachometer generator 170, is used in conjunction with the predrive tachometer generator 154. These two devices provide signals which are proportional, respectively, to the speed of the press (i.e., the speed of the web W drawn into the press) and to the speed of the motor 59 (i.e., to the speed of the belt 58 and the peripheral speed of the new roll 26 driven by that belt). These two signals, specifically, the difference between them, are used to actuate a circuit 171 which adjusts the generated output voltage of the amplidyne 60 connected to energize the motor 59. The output voltage of the amplidyne 60 and the resulting speed of the motor 59 are thus automatically adjusted until the tachometer signals have a predetermined relation indicating that the peripheral speed of the new roll 26 substantially matches the running speed of the web W. In some instances, it may be desirable to make the peripheral speed of the new roll about ½ percent to 1 percent faster than the running web speed. This may be accomplished easily by an adjustment to be described.

The amplidyne 60 may be of conventional construction, including an armature 60*a* (Fig. 8) in series with a compensating field winding 60*b*. The voltage at the terminals of the armature varies as the degree of current unbalance in two controlling field windings 60*c*, 60*d*. That is, as the current through the winding 60*c* increases it tends to decrease the voltage at the armature 60*a*, while an increase of current through the field winding 60*d* tends to increase the voltage at the armature 60*a*. The windings "buck," i.e., no voltage is generated by the armature 60*a* when the currents through the windings 60*c* and 60*d* are equal. High power amplification may thus be obtained by controlling the balance or unbalance of the currents. As shown in Fig. 2, the amplidyne 60 is continuously driven by a suitable electric motor 60*e*.

The motor 59 may be of the conventional D.C. type having a shunt field 59*a* continuously energized from any suitable D.C. source. The motor is connected in series with the amplidyne armature 60*a* and compensating winding 60*b* through an ammeter 175 and normally open relay contacts PD–3, which, as explained below, are closed when the motor is performing its predrive and braking functions. The speed of the motor 59, and thus the peripheral speed of the new roll 26 are proportional to the output voltage of the amplidyne armature 60*a*.

That voltage is controlled by the currents through the respective windings 60*c* and 60*d* which are adjusted according to the relative magnitudes of the speed-responsive signals from the tachometers 154 and 170. The two tachometers are connected in series opposition as shown in Fig. 8, the predrive tachometer 154 being shunted by a potentiometer 176 which permits proportioning adjustments. It will be observed that with the relay contacts PDS–3 open and the relay contacts PDS–2 closed (as they are during predrive operation), the voltage between the lines 178, 179 varies as the difference between or algebraic sum of the speed signal from the tachometer 170 and the speed signal from the tachometer 154 as tapped from the potentiometer 176.

This difference signal is fed through an R.C. filter 180 and a grid resistor 181 to the control electrode 182 of an amplifying electron discharge device or vacuum tube 184. The line 179 is correspondingly connected through a grid resistor 185 to the control electrode 186 of a similar electron discharge device or vacuum tube 188 which may be in the same envelope. The respective cathodes 189, 190 of these two amplifier tubes are connected through a common cathode resistor 191 to the negative line 197 of a 250 volt D.C. source which may be considered, for convenience, at zero or "ground" potential. The respective anodes 192 and 193 are connected through individual load resistors 194 and 195 and thence through a balancing resistor 196 to the positive side or line 198 of the D.C. source. All potentials not otherwise given in relative terms hereinafter will be considered with reference to the line 197, assumed to be at zero volts or "ground" potential.

The line 179 is connected to the junction 200 of a potential dividing network so that it is maintained at a potential in the order of +52 volts. The dividing network includes a first resistor 201, a potentiometer 202, normally closed relay contacts RR1–*a*, a second resistor 204, a second potentiometer 205, and a rheostat 206.

With the control electrode 186 at such a high potential, current through the discharge device 188 is normally very high, being limited by the self-biasing action of the cathode resistor 191. If the voltages generated by the tachometers 154 and 170 exactly cancelled, the control electrode 182 would also be at 52 volts and current through the tube 184 substantially equal to that through the tube 188. However, when the contacts PDS–2 first close (and PDS–3 open) the motor 59 is stationary and the voltage generated by the tachometer 154 is zero. The tachometer 170 thus increases the potential of the grid 182 above that of the line 179, and the tube 184 conducts more heavily than the tube 188. Accordingly, lines 208 and 209 connected to the respective load resistors 194, 195 have relatively lower and higher potentials.

The potential on these lines is fed through R.C. filters 210 and 211, respectively, to the control electrodes 212 and 213, respectively, of electric power amplifying tubes 214 and 215. The signals appear across the respective grid resistors 216 and 218 connected to ground. The power tubes 214 and 215 are preferably tetrodes having their screen grids 219, 220 supplied with a relative high potential through a common screen grid resistor 221 connected to the positive line 198. The respective cathodes 222, 224 of the two devices are connected through individual cathode resistors 225, 226 and a common cathode resistor 228 to ground. Filter capacitors 229 and 230 may be connected between the control grids and cathodes as shown. The anodes or plates 231, 232 of the two power amplifiers 214, 215 are connected in series with the two amplidyne field windings 60*c*, 60*d* respectively to the positive voltage supply line 198. Preferably, these windings are shunted by resistors 234 and 235 to reduce the effects of induced voltages as current is changed abruptly.

When the current through the tube 184 is greater than the current through the tube 188, the control electrodes 212 and 213 are at respectively lower and higher potentials. Accordingly, current flowing through the power amplifier 214 and the amplidyne field winding 60*c* is considerably less than that flowing through the device 215 and the field winding 60*d*. Therefore, the voltage at the amplidyne armature 60*a* is relatively great, having the polarity marked in Fig. 8. The motor 59 accelerates.

As long as the signal supplied by the press-driven tachometer 170 is greater than that opposing voltage tapped from the predrive tachometer 154, the control electrode 182 of the tube 184 will be more positive than the control electrode 186 and a relatively great voltage will be present at the amplidyne armature. However, as the predrive motor 59 brings the new roll up to the desired speed, the signal provided by the tachometer 154 increases in magnitude, thus bucking to a greater degree the voltage generated by the tachometer 170 and reducing the positive potential of the grid 182. Thus, the balance of current in the amplidyne winding 60*c*, 60*d* is more nearly restored and maintained at a certain value such that the amplidyne armature voltage maintains the speed of the motor 59 with the peripheral speed of the new roll 26 substantially equal to the running speed of the web W.

Due to the extremely high amplification afforded by the amplidyne, it is desirable to limit the amplidyne armature current during that period of time when the motor 59 is accelerating and the bucking signal of the tachometer 154 is so small that the potentiometer 170 places a relatively high potential on the control electrode 182. For the purpose of limiting the magnitude of voltage generated in the armature 60*a*, an amplifying tube or discharge device 240 has its anode 241 connected directly to the line 209 so that current flowing in the tube will, in passing through the balancing resistor 196, lower the potential at the upper end of the grid resistor 218, thus lowering the potential of the control grid 213, and thereby limiting the current flow in the field winding 60*d*. The cathode 242 of the tube is connected directly to the movable contact 202*a* of the potentiometer 202. This cathode normally has a potential, therefore, in the order of 60 volts. The control grid 244 of the tube 240, however, is connected through a resistor 245 to the upper end of the compensating field winding 60*b* which has its lower end connected to the line 179. As a result, when no current is flowing in the compensating winding 60*b*, and there is no voltage drop thereacross, the cathode 242 is positive with respect to the control grid 244 and the tube 240 is cut off. As soon as current begins to flow through the compensating winding 60*b*, in the direction shown by the solid arrow, the voltage drop from the upper to the lower end of the compensating winding 60*b* results in an increase of the potential on the grid 244 relative to that of the cathode 242. When the current through the compensating winding reaches a limit value, say, for example, adjusted by means of the movable tap 202*a* to be about 10 amperes, the grid 244 swings positive with respect to the cathode 242 and heavy current flows through the tube 240. This heavy current flow results in a drop of potential on the line 209 so that the control grid 213 for the power amplifier 215 is maintained at a fairly low value. Current flowing through the device 215 and the field winding 60*d* is limited and the voltage generated in the armature 60*a* reduced to such an extent that the current flowing through the compensating winding 60*b* and the motor 59 cannot exceed the predetermined value of, say, 10 amperes.

It will thus be apparent that the control circuit described automatically brings the new roll 26 up to a speed matching the speed of the web and maintains it there when under predrive conditions, that is, when the predrive carriage 52 is lowered to bring the belt 58 against the new roll, and the contacts PDS–2 and PD–3 are closed, with the contacts PDS–3 open. The controlled speed of the motor 59 relative to the press speed as reflected by the press tachometer 170 may be initially adjusted by setting the movable tap of the potentiometer 176, so that the peripheral speed of the new roll matches the running web speed. In order to adjust the predetermined limit current through the amplidyne armature 60*a*, the compensating winding 60*b*, and the motor 59, the movable tap 202*a* may be set to vary the initial negative bias on the tube 240 which when overcome by the voltage drop across the compensating winding 60*b* results in conduction of the tube 240 and a clamping or limiting action on the current output of the amplidyne.

*The transition tension controls*

The present invention also provides for transition tension in the new roll web immediately after the expiring roll web has been severed. This transition tension is not only maintained at a predetermined value according to the tension setting of the pneumatic system described, but also effects such transition tension through the same motor 59 and drive belt 58.

To perform this automatic braking action and provide transition tension in the web, the contacts PDS–2 are opened and the contacts PDS–3 are closed. The motor 59 is now driven as a generator by the new roll and regeneratively brakes the latter.

With the closure of the contacts PDS–3, the tube 184 is cut off because the voltage across the motor armature makes the line 178 negative in potential with respect to the line 179. Since the line 179 is maintained at about 52 volts positive with respect to ground, and since the induced voltage across the motor 59 is, at normal press speeds during the pasting cycle, considerably greater than 52 volts, the potential of the control grid 182 with respect to its grounded cathode 189 is negative. The potential of the control grid 186 is substantially the same as that of the line 179 so that the amplifying device 188 conducts heavily.

Accordingly, there is a relatively high potential supplied over the line 208 to the grid 212 of the power amplifier 214. As a result, the voltage of the armature 60*a* tends to be very small because current through the winding 60*c* is high and current through the winding 60*d* is relatively low. With the voltage across the amplidyne armature 60*a* now bucking the back E.M.F. of the motor 59 acting as a generator, and with the amplidyne armature voltage relatively low, a fairly high current flows from the motor 59, through the compensating winding 60*b*, through the armature 60*a*, through the closed contacts PD–3 and the ammeter 175. This current flows in the opposite direction as indicated by the dashed arrow, creating a voltage drop from the bottom to the top of the compensating winding 60*b*.

It will be understood, that the greater the current flow through the motor 59, the greater its effect as a regenerative brake. Thus, the greater the current flow in the direction shown by the dashed arrow, the greater the resistance to turning of the belt 58, the greater the retarding effect of the belt 58, and the greater the tension in the new web drawn from the roll 26.

In accordance with the invention, this braking current through the motor 59 is automatically controlled, even though its speed varies, so as to maintain the web tension at the same value that would be obtained if the new roll were already in normal operative contact with the tension belts 30. For this purpose, a fourth electron discharge device or tube 250 has its anode 251 connected directly to the line 208 so that conducted current in flowing through the left portion of the balancing resistor 196 results in a potential decrease across the grid resistor 216 and at the control grid 212. The control grid 252 for the device 250 is connected through a current limiting resistor 254, a second resistor 255, through normally closed relay contacts D–3 (or through the contacts PDX–1 if they are closed), through normally closed contacts RR1–*d* and thence to the movable wiper 205*a* of the potentiometer 205. The control grid 252 is thus provided with a positive potential which may be adjusted between the limits of say, 3 to 25 volts positive with respect to ground by moving the wiper 205*a*.

The cathode 256 of the device 250 is, on the other hand, connected directly to the upper end of the compensating winding 60*b* and, through that winding, to the line 179 which due to its junction 200 with the potential dividing network remains at a constant voltage of about +52 volts. Normally, therefore, the control grid 252 is negative with respect to its cathode 256 and no current flows to the anode 251. However, as soon as braking current flows in the circuit including the motor 59 and amplidyne armature 60*a* in the direction shown by the dashed arrow, a plus-to-minus voltage drop appears from the bottom to the top of the compensating winding 60*b*. This bucks the potential of 52 volts present on the line 179 and thus decreases the potential of the cathode 256. When the braking current reaches a predetermined magnitude, adjusted by setting the potentiometer wiper 205*a*, the cathode 256 becomes negative with respect to the grid 252 and heavy current flows through the anode 251. This in turn drops the potential on the control grid 212 so that current flows through the amplidyne winding 60c decreases sharply. This, in turn, results in an increase of the voltage at the terminals of the amplidyne armature 60a.

Since this amplidyne voltage directly bucks the generated voltage in the motor 59, the circulating braking current is sharply reduced. In another sense, it is clamped or limited to a predetermined value. It will be seen that the tube 250 automatically operates to control the voltage of the armature 60a so that a predetermined constant braking current flows through the motor 59 and thus causes the latter to exert a constant retarding force on the new roll 26. In this manner, the transition tension in the new roll web is maintained at a particular value adjusted by setting the potentiometer wiper 205a, i.e., by setting the original negative bias on the tube 250 and the point at which it begins conducting.

In accordance with one of the features of the invention, the magnitude of transition tension maintained by regenerative braking of the motor 59 is automatically set to agree with the web tension provided by the tension belts 30 under normal operating circumstances. As shown in Fig. 2, a signal is applied to the control circuit 171 which reflects the tension setting for the belts 30. For this purpose, a pressure potentiometer 260 has its bellows 261 connected to receive air pressure determined by the manual adjustment of the pressure regulator valve 42. A pressure gauge 262 may also be provided at this point and calibrated directly in tension so that an operator may read what tension is provided for any given setting of the regulator 42. As the pressure to the loading cylinder 40 is adjusted by turning the regulator 42, the bellows 261 expand or contract. These bellows are connected to the pivoted wiper arm 205a for the potentiometer 205 which is connected in the control circuit as shown in Fig. 8. Thus, as the regulator 42 is adjusted, the wiper arm 205a is moved proportionally by the bellows 261 and the initial bias on the control grid 252 automatically adjusted. This, as explained above, determines the amount of braking current which must flow through the motor 59 before the device 250 conducts to increase the amplidyne armature voltage and maintain the current at that value.

The rheostat 265 shown in Fig. 8 is provided for the purpose of determining the range of potential adjustment provided by movement of the wiper arm 205a. However, it is desirable to maintain the total resistance of the potential dividing network across the D.C. lines 197, 198 substantially constant in order that the potential of the junction 200 and of the wiper 202a will not be materially changed when the rheostat is adjusted. For this purpose, a rheostat 265 is connected in series with a resistor 266, the two being in parallel with the potentiometer 205. The wiper arms for the rheostats 265 and 206 are ganged so that, upon adjustment, the total resistance of the potential dividing network remains substantially constant.

It may sometimes happen that during the period that the regeneratively braked motor 59 is providing transition tension determined by the setting of the potentiometer 205, the press will be slowed down or stopped. The new roll 26 might then overrun to cause a slack loop in the web. To prevent this, the transition tension is automatically changed to a different value in response to a decrease in the press speed.

This is accomplished by the control circuit 171 working in conjunction with relays which will be described later. As shown in Fig. 8, four contacts RR1–*a* through *d* for the same relay are employed. The normally closed contacts RR1–*a* break the potential dividing network just below the junction 200 when they are opened. When this happens, the normally open contacts RR1–*b* connect a potentiometer 270 directly between the line 179 and ground thus creating a new potential dividing network. At the same time, the normally closed contacts RR1–*d* open to disconnect the wiper 205a from the control grid 252, while the normally open contacts RR1–*c* close to connect the potentiometer wiper 270a to that control grid through either the contacts D–3 or PDX–1, whichever happen to be closed. As a result, the control grid 252 receives a constant positive potential determined by the setting of the wiper 270a, and this potential is usually lower than that initially provided by the potentiometer 205. Therefore, the bias below cut-off for the tube 250 is increased and the amount of braking current which may flow through the motor 59 is correspondingly increased. Whenever the relay RR–1 is actuated as explained below, in response to stoppage of the press or a decrease in press speed, a greater transition web tension is thus effected.

In accordance with another feature of the invention, the transition tension provided by regenerative braking of the motor 59 is gradually decreased when the reel reaches a predetermined rotational position and the new roll 26 moves into frictional engagement with the tensioning belts 30. To provide such smooth transfer of web tensioning, a capacitor 271 is connected between the line 179 (normally maintained at approximately +52 volts) and the grid resistor 254 (Fig. 8). Additionally, a resistor 272 is connected between the line 179 and the junction of the resistor 255 with the contacts D–3 and PDX–1. With this arrangement, the capacitor 271 charges through the resistor 255 to a voltage equal to the difference in potential between the line 179 and the wiper 205a or 270a, whichever is operatively connected according to the condition of the contacts RR1–*a* through *d*. By means of a relay control circuit to be described, the contacts D–3 and PDX–1 are both opened just after the periphery of the new roll starts to engage the tension belts 30. When this occurs, the capacitor 271 discharges exponentially through the resistors 255 and 272 so that the potential of the control grid rises slowly from that initially determined by the wiper 205a (or the wiper 270a) to the potential of the line 179. In this manner, the bias below cut-off of the vacuum tube 250 is gradually reduced to zero so that the current through the control winding 60c decreases, and the bucking voltage generated in the amplidyne armature 60a gradually increases. As a result, the controlled braking current flowing through the motor 59 is gradually reduced to zero. Thus, as the new roll moves into the tension belts, the regenerative braking afforded by the motor 59 is exponentially reduced to zero as the tension belts 30 assume their normal function with the new roll. This gradual decay of transition braking tension is obtained regardless of whether the bias for the control grid 252 is originally obtained from the potentiometer wiper 205a under normal press speeds or from the potentiometer wiper 270a following a press speed decrease and actuation of the relay RR–1.

As an alternative for the pressure potentiometer 260 illustrated in Fig. 2, an electrical element may be mechanically ganged to the manual adjustments knob of the pressure regulator for the main tensioning system. Such an arrangement is shown in Fig. 9. A pressure regulating valve 42b is disposed within a suitable housing and is adjustable by turning an external knob 42c which rotates a threaded shaft 42d to shift the latter axially. Input and output lines for the pressure regulator valve are connected in the usual manner, and a pressure gauge 262a may be mounted within the same housing and connected as shown schematically in Fig. 2 to give direct readings of the selected tension which the belts 30 automatically maintain.

A potentiometer 205b is also disposed within the housing and connected electrically in the same manner as the potentiometer 205 shown in Fig. 8. In order to adjust the setting of the potentiometer 205b in proportion with the setting of the knob 42c and the resultant web tension maintained by the belts 30, a pinion 280 fast on the shaft 42d meshes with a larger spur gear 281 to drive a stub shaft 282. The pinion 280 may shift axially with the shaft 42d relative to the spur gear 281. The shaft 282 is connected by a coupling 284 to a shaft 205*c* which controls the movable wiper of the potentiometer 205*b*. Disposed in the paths of radial lugs on a collar 281*a* of the spur gear is a stop pin 285 which prevents rotation of the potentiometer shaft 205*c* beyond its limit positions.

In operation, as the knob 42*c* is turned to set the pressure regulator 42*b*, the spur pinion and gear 280, 281 rotate the shaft 282 and the potentiometer shaft 205*c* proportionately so that the setting of the potentiometer 205*b* reflects the tension which is automatically maintained by the belts 30. The bias below cut-off for the regenerative braking current control tube 250 is thus automatically adjusted, as explained above, so that the transition tension caused by regenerative braking of the motor 59 is made substantially equal to the tension provided by the belts 30.

*Paster carriage assembly*

In physical structure, the paster carriage has two side frames 300, 301 (Figs. 10 and 11) held fast at their one end on the support shaft 68 journaled between the supports 51. The shaft is rocked to raise or lower the frames 300, 301 by the double-acting air ram 69 which has its cylinder fast on one support 51 and its piston rod connected to a radius arm 304 fixed at one end of the shaft. Rotatably extending between the side frames are a brush shaft 306, a knife shaft 308 and a safety shaft 310.

As shown in Fig. 12, the brush shaft 306, which is shaped like the knife shaft 308, is non-circular in cross section having an integral lip 306*a* which presents a tangential surface 306*b* to which brush brackets may be bolted. Referring again to Fig. 11, a plurality of the brushes 78 are held axially spaced on the shaft 306 by brackets 312 which are bolted directly to the flat surface 306*b*. In this manner, clamping of the brackets to the shaft, with the attendant possibility of slipping and the necessity of accurately phasing the brushes on a circular shaft, is eliminated.

It will be understood that the several brushes 78 are spaced axially to clear the tension belts 30 when deflected outwardly against the web as shown by dashed lines in Fig. 10. Moreover, in order to deflect the tension belts 30 at the same time that the brushes engage the running web W, a plurality of belt deflectors 314 are bolted fast to the shaft 306 in between the brushes. These move the belts 30 at the same time that the web is deflected and eliminate wrinkling of the web by providing contact with either the brushes or the belts along its full width. If the spaced brushes alone press against the web, longitudinal wrinkles in the web might occur. And as these run through the press, particularly around rollers, there is likelihood that they may crack or tear transversely, thus rupturing the entire web and necessitating a press stoppage and rethreading.

Bolted in axially spaced relation to the flat surface on the non-circular shaft 308 are a plurality of the serrated knives 79, the spacing between the knives leaving clearance for the tension belts 30 as they swing outwardly to sever the web.

For biasing the brush and knife shafts 306 and 308 in a counterclockwise direction (as viewed in Fig. 10), each is equipped with torsion springs 316, 318 and 319, 320 respectively. These springs are cocked by clockwise rotation of the shafts 306 and 308 as an incident to retraction of the carriage to its upper position as explained more fully below.

On the outer side of the frame 300 a latch cam 325 fast on the brush shaft 306 is engaged by a latch on a bell crank 326 biased in a clockwise direction (Fig. 10) by a torsion spring shown in Fig. 11. As the shaft 306 is cocked clockwise, the bell crank snaps into the cam 325 to hold the shaft 306 against the torsional loading of the springs 316, 318. The bell crank latch 326 may be tripped when its opposite arm is struck by the plunger 328 of a solenoid 329 when the latter is energized. Concurrent with energization of the solenoid 329, and rocking of the bell crank 326 counterclockwise (Fig. 10), a limit switch 3LS, having its follower riding on a control surface of the bell crank, is actuated. This switch has a plurality of contacts used for control purposes as explained below.

A similar latch and latch tripping arrangement is employed for the knife shaft 308. A latch cam 331 fast on the end of the knife shaft 308 is engaged by a latch arm on a pivoted bell crank 332. The opposite arm of the bell crank is disposed in the path of a plunger 334 which is extended when a knife release solenoid 335 is energized. A limit switch KLS is mounted with its follower riding on an eccentric cam 331*a* fixed to the latch cam. The switch contacts are thus actuated whenever the knife shaft 308 is released by energization of the solenoid 335.

Also mounted on the outer surface of the frame member 300 are two carriage limit switches 1CLS and 2CLS which are used for control purposes as explained below. The switch 2CLS is gravity-operated whenever the paster carriage approaches its lowered operative position. For this purpose, the switch 2CLS, which has a plurality of contacts, may include mercury bottles mounted in suitable angularly adjustable spring clips. The carriage limit switch 1CLS is depressed by a stop pin 338 whenever the carriage is fully retracted. This will be considered the normal or de-actuated condition of the switch, its contacts being actuated when the carriage is lowered.

The retraction of the paster carriage from its lowered position is so controlled that it cannot trap an object, for example, a man which might be standing in the way. To this end, the safety shaft 310 carries a plurality of rearwardly extending safety deflectors 340 which project beyond the rear surfaces of the frame members. The shaft 310 and the radially extending deflectors 340 are urged clockwise as shown in Fig. 10 by a suitable torsion spring 341 (Fig. 11). Mounted fast on the shaft 310 at the outer surface of the frame 300 is a camming arm 342 engaged by the follower of a carriage safety switch CSS. This switch is, therefore, actuated whenever the deflectors 340 strike an object as the carriage retracts and thus rock the shaft 310 counterclockwise as viewed in Fig. 10. The contacts for the safety switch CSS are connected into the sequence control circuit as explained more fully below.

Between the free ends of the frames 300, 301 there extends a large, hollow web deflector tube 345. As the carriage swings downwardly to its operative position shown by dashed lines in Fig. 10, a smoothly rounded surface on this tube engages both the running web W and the tension belts 30 to shift them inwardly. The web thus runs substantially vertically past the brushes 78 and knives 79 before they are released. The deflector tube 345 assures that the running web W and the brushes and knives have the same relative positions prior to actuation of the latter so that the same deflecting and severing action always takes place.

It will be seen in Figs. 10 and 10*a* that the tension belts 30 bear at axially spaced locations against the deflector tube 345 and the running web W bears against the belts but also against the tube between the belts. The portions of the web running over the belts 30 have to travel farther, and if belts are thick longitudinal wrinkles may be formed in the web at the edges of the belts. Such wrinkles, as explained before, may often crack transversely as the web runs over rolls in the press, resulting in rupture of the entire web.

To obviate this difficulty, the radius of curvature of the deflector tube 345 is made very large as compared to the thickness of the tension belts 30. Preferably, the radius of curvature of the tube surface is at least 200 times the thickness of the belts so that a sharp bend or wrinkle in the web is eliminated. As shown in Fig. 10, only a slight, smooth curve is created in the web portions W1 at the edges of the belts 30. This web flexure is not sufficient to cause appreciable wrinkling. In order to achieve the above-stated relationship of the curvature of the deflector tube surface and the tension belt thickness, the latter is not made cylindrical. Rather, it is four-sided, with each surface having its center of curvature displaced from the geometrical center of the tube. Considerable space is saved as compared to using a large diameter cylindrical tube.

*Cocking mechanism*

The mechanism for cocking the brush shaft 306 and the knife shaft 308 against their torsion spring as the carriage is retracted is illustrated by stop motion views in Fig. 13. On the outer side of the frame member 301, these two shafts are provided with rigidly attached hubs 346, 347 (Fig. 11) which have a plurality of circularly spaced jaws 348 and 349, respectively (Fig. 13). Rotatable on the two shafts are respective cocking levers 350, 351 which have circularly spaced jaws 350*a* and 351*a*, respectively. These latter jaws interfit axially between the hub jaws 348 and 349, but with freedom for relative circular movement. A first link 352 is pivotally connected between a pin 354 fast on the stationary support 51 and a pivot pin 355 on the lever 350. A second link 356 is pivotally connected between the two levers 350, 351. It will be observed that the anchor pin 354 is located somewhat beneath the support shaft 68.

As the frame 301 swings upwardly toward its retracted position, the brush shaft 306 swings about the shaft 68 while the first link 352 pivots about the stationary pin 354. Due to the difference in centers, therefore, the link 352 rocks the cocking lever 350 about the shaft 306, bringing the jaws 358 into abutment with the jaws 348. As a result, when the carriage is retracted the shaft 306 is rocked counterclockwise (clockwise as viewed in Fig. 10) until the bell crank 326 snaps into latching engagement with the cam 325. Correspondingly, the lever 350 is rocked by the link 352; the link 356 necessarily rocks the cocking lever 351 counterclockwise as viewed in Fig. 13. By this action, the lever jaws 351*a* are brought into engagement with the hub jaws 349 so that the knife shaft 308 is rocked counterclockwise (clockwise as viewed in Fig. 10) against its torsion springs until the bell crank 332 snaps into latching engagement with the cam 331. In this manner, the torsion springs for the brush and knife shafts are automatically loaded and the latch means for those shafts engaged as an incident to retraction of the carriage.

As the carriage descends from its operative position, however, the links 352 and 356 cause the cocking levers 350, 351 and their jaws to rotate clockwise relative to the shafts 306, 308 and the hub jaws fixed thereon. The cocking lever jaws 350*a* and 351*a* retreat from the hub jaws because the shafts are latched, leaving a clearance space between the jaws which permits the shafts to be rotated and the brushes and knives deflected outwardly whenever their respective release solenoids are energized.

When the brush shaft is released, the force of the torsion springs is cushioned by flexure of the brush bristles in pressing the running web W against the new roll 26. There is no impact between the jaws 350*a* and 348. To prevent impact between the jaws 351*a* and 349 when the knife shaft is released, a hydraulic shock absorber 360 is mounted on the outer side of the frame 301 with its plunger 361 in the path of an ear 362 integral with the hub 347. As the ear strikes the plunger, the knives are brought to a smooth stop in their deflected position, leaving slight clearance between the jaws 351*a* and 348.

*Brush pressure adjustment*

The width of the paper web and of the rolls is often varied for different types of printing operations. For example, the width of the paper rolls may be ¼, ½, ¾ or the full width of the roll for which the press is arranged. When fractional widths are used, it is desirable that the pressure with which the brushes urge the running web against the new roll be reduced to prevent excessive pressure of the brushes from rupturing the running web.

For this purpose, a simple yet conveniently operated bias adjusting mechanism is associated with the torsion spring 316. As shown in Figs. 11 and 12, one end of the torsion spring 316 is anchored in the lip 306*a* of the shaft 306 and its other end is anchored in a collar 370 formed with gear teeth 371 on its cylindrical surface. The collar is rotatable on a cylindrical portion of the shaft 306 adjacent the inner side of the frame 301. For holding the collar stationary with respect to the frame and for adjusting its angular position to change the bias in the spring 316, a capstan 372 integral with a pinion 374 is journaled on a pin 375. The pinion 374 is, in turn, releasably locked against rotation by a pawl 376 pivoted on a pin 379 and urged into engagement with the gear teeth by a tension spring 378.

To adjust the cocked torsion in the spring 316, an operator need only insert a capstan bar 380 through alined holes in the capstan, rock it to take pressure off the pawl, depress a handle 376*a* to rock the pawl 376 about its pivot 379 against the bias of the spring 378, and then turn the capstan bar 380. Rotation of the capstan and the integral pinion 374 causes the collar 370 to be rocked clockwise or counterclockwise (Fig. 12) to increase or decrease the bias in the spring 316. The pawl handle 376*a* is then released so that the gear 374 and the collar 370, are locked in a selected position.

*Safety latch*

In order to assure that the paster carriage will be held in its retracted position even though there should be a failure in the supply of fluid pressure to the double-acting ram 69, a safety latch hook 385 is pivoted at 386 to the support 51 (Fig. 10) and disposed beneath a latch pin 388 fixed in the frame 300. As the carriage retracts, the pin 388 strikes a curved surface on the latch hook 385, rocking the latter counterclockwise, against a compression spring 389*a* (Fig. 14), until it falls beneath the pin. For moving the latch hook 385 when the carriage is to be lowered, a fluid pressure actuator or cylinder 389 is disposed such that its piston rod, working against the compression spring 389*a*, strikes the latch hook and rocks it counterclockwise.

*The pneumatic controls for the paster carriage*

The incorporation of the latch controlling cylinder 389 into the pneumatic controls for the ram 69, and the organization of these controls will become clear upon reference to schematic Figs. 14–17. The four-way, two position valve 70, controlled by energization of the solenoid 71, receives air pressure through an inlet 395 and may exhaust air through an outlet 396. This valve is also connected through lines 398 and 390, and through the respective two-way safety valves 72 and 73 to the opposite sides of a piston 69*a* in the actuator 69. The safety cylinder 389 is connected by a line 400 to the line 398 so that it receives air pressure whenever the valve 70 is in its actuated (solenoid 71 energized) position. Connected in parallel with the safety valve 73, i.e., from the line 399 to the right side of the actuator 79 is a bleeder valve 401 having a spring-biased plunger 402 which is shifted against the spring by the carriage when the latter is fully retracted. Such shifting of the plunger 402 opens a small bleed port 404 to permit slow transfer of air through the valve.

Figure 14:
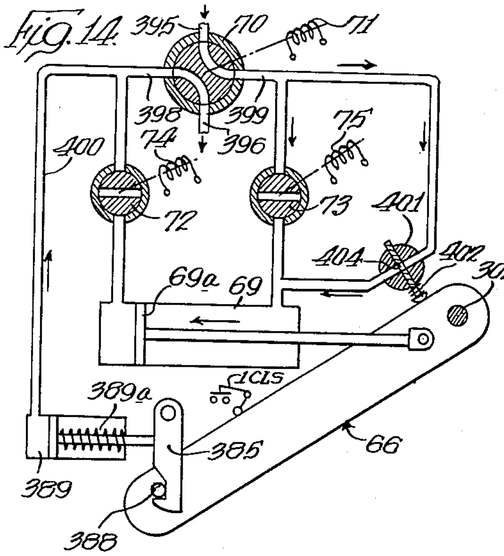

Fig. 14 illustrates the condition of this pneumatic circuit when the carriage is retracted and locked safely by the latch hook 385. The solenoids 74 and 75 are deenergized so that the safety valves 72 and 73 are closed. The solenoid 71 is also deenergized, the valve 70 venting the line 398 to the atmosphere, and supplying the line 399 with air pressure through the inlet 395. This pressure is maintained on the right side of the piston 69*a* through the bleed port 404. The cylinder 389 being exhausted, its piston and piston rod retreat to the left under the influence of the compression spring 389a, so that the hook 385 embraces but does not engage the pin 388. If the air pressure supply should fail and the carriage 66 starts to drop, it will move slowly due to the throttling action of the bleeder valve 401, but the hook 385 will engage the pin 388 and thus hold the carriage up.

Figure 15:
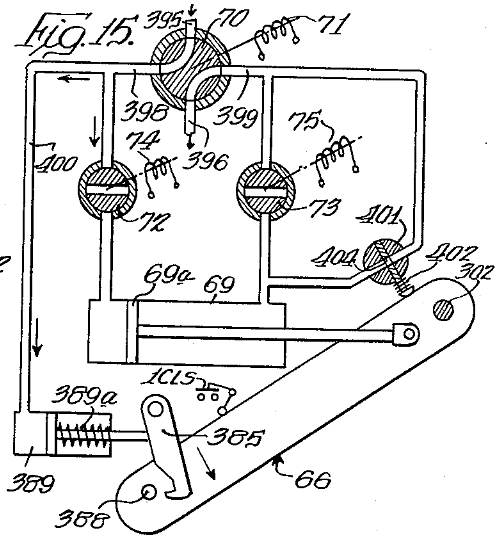

When the carriage is to be lowered the solenoid 71 is energized so that the valve 70 moves to its opposite position as shown in Fig. 15. Air pressure is thus supplied to the safety cylinder 389, moving its piston to the right and rocking the safety hook 385 clear of the pin 388. At the same time, the line 399 is vented to the atmosphere so that air on the right side of the piston 69a may bleed through the valve 401, letting the carriage drop slowly under the influence of gravity.

Figure 16:
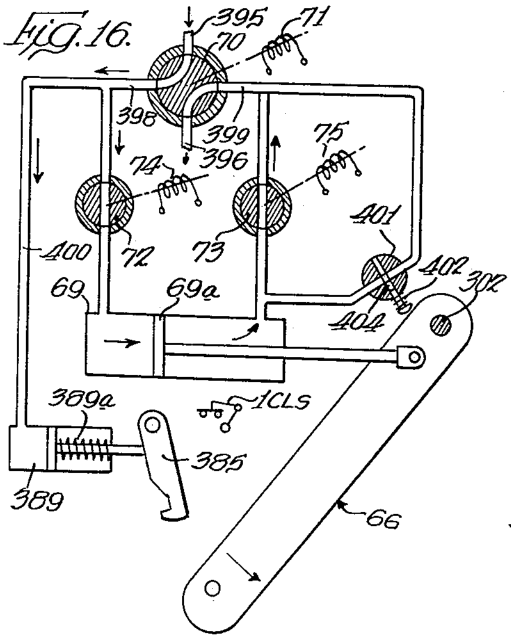

When the carriage has descended a predetermined amount, the limit switch 1CLS is actuated. This, as explained below, results in the energization of the solenoids 74 and 75 for the safety valves 72 and 73. Since these safety valves are thus opened, as shown in Fig. 16, the right side of the piston 69a is exhausted to the atmosphere and its left side supplied with air pressure. The actuator 69 thus rocks the carriage to its lowered position, the plunger 402 moving outwardly to close the bleed port 404.

To raise the paster carriage from its lowered position it is only necessary to deenergize the solenoid 71 for the valve 70. This valve then returns to the position shown in Fig. 14 while the safety valves 72, 73 remain open. The left side of the piston 69a is vented and its right side supplied with air pressure. Once the carriage has retracted sufficiently to cause de-actuation of the limit switch 1CLS, then the safety valves 72, 73 reclose to return the system to the condition shown by Fig. 14.

Figure 17:
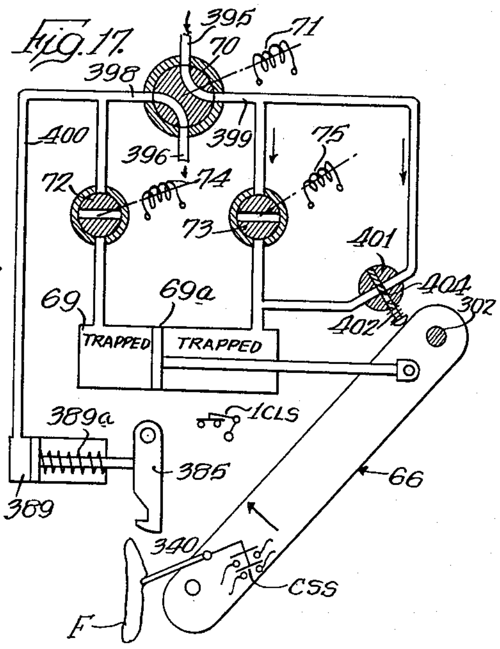

Fig. 17 illustrates the operation of the pneumatic controls if a foreign object F should be disposed in the path of the carriage as it is retracted. The safety deflectors 340 strike the object F, thus rocking the safety shaft 310 and actuating the carriage safety switch CSS. Even though the limit switch 1CLS is actuated at this time, the movement of the switch CSS, as described more fully below, results in the deenergization of the solenoids 74, 75 for the two safety valves 72, 73. These valves thus close at once, completely trapping air on either side of the piston 69a. The bleeder valve 401 is also closed at this time. Therefore, the piston 69a and the carriage 66 are halted. They cannot be moved upwardly until the foreign object is removed and the safety deflectors 340 are released. Any object thus disposed in the retracting path of the carriage cannot be crushed, nor can it cause damage to the carriage itself.

*Sequence controls and operation*

The safety and sequence controls, and the overall operation of the splicing apparatus, may best be understood with reference to the schematic electrical circuit in Fig. 18. The various relay coils are identified by the same alphabetical symbols used to identify their various contacts, which are distinguished by numerical suffixes. The various limit switches, mercury switches, slip rings, and brushes identified above are marked in Fig. 18 with the same reference characters previously employed.

Those particular limit switches or other components in the reel assembly are enclosed by dashed rectangles in Fig. 18 for ease of identification. In a similar manner, those electrical components on the paster carriage are shown enclosed in dashed circles for convenience, while those on the predrive frame are enclosed in dashed triangles. All switch and relay contacts are shown open or closed, as the case may be, as they are when the predrive carriage and paster carriage are both retracted prior to the beginning of an operational cycle.

*Spindle brake and breaker point operation*

Before taking up the overall operation of the circuit in Fig. 18, the manner in which the slip rings and gravity-operated mercury switches in the reel assembly control the spindle brakes will be considered.

Referring to Fig. 18, the slip ring 112 and brush 125 function merely to conduct current from a stationary point to the interior of the reel spider 88 (Figs. 4 and 5). From the one voltage supply line, the ring 112 leads current to a common connection for the three breaker points 98. On their opposite sides, the breaker points 98 are connected to respective ones of the three segments of the slip ring 114, the brush 127 completing a circuit for one set of points through relay contacts PA–2 and a relay coil E to the other voltage supply line. The segments of the ring 114 are so phased with respect to the stationary brush 127 that when any one of the three spider arms 90, 91, 92 (Fig. 2) is in the pre-paste position, i.e., in the zone between the lines I and II in Fig. 1, the breaker points in that particular arm are in series with the coil E. This assures that the energization or deenergization is timed relative to the rotational position of the new roll, and not to that of the newly loaded or expiring rolls.

The slip ring 113 and brush 126 serve to transfer current from a stationary connection to the interior of the rotating spider 88. The three rectifiers 130 for the respective brake windings are connected in common at one side to the ring 113 and supplied with current at the other side through the toggle switches 131 and the mercury switches A–0, B–0, etc. on the corresponding spider arm. The energization of each brake winding is controlled according to the angular position of the corresponding spider arm either by the mercury switches alone (through the slip ring 112) or through the mercury switches and the segmented slip ring 111. For example, with the toggle switches 131 closed, the uppermost winding 95 in Fig. 18 is energized through the slip ring 112 when mercury switches B–0 and A–0 are both closed, irrespective of the other mercury switches. Alternatively, that brake winding may be energized through the contacts PD–2 when the mercury switches A–0 and C–0 are closed if the segment connected to the A–0 switch is under the brush 122. That winding will also be energized through the closed contacts KLS–2 if the ring segment connected to the switch D–0 is beneath the brush 124 and the D–0 switch is closed.

By adjusting the angular zones in which the several mercury switches A–1 through D–1 are closed, the following operation is obtained for the brake winding 95 in the arm 91. The same pattern occurs for the other brake windings.

As the reel rotates clockwise as viewed in Fig. 1, and the arm 91 resides in the zone between the lines III and IV, both the switches B–1 and C–1 are closed. Therefore, current flows from the slip ring 112 (Fig. 18) through these switches to energize the brake winding 95 in that arm. If desired, the brake may be released by opening the toggle switch 131, permitting a newly loaded roll to be turned so that a glue pattern thereon is adjacent the running web when that roll is advanced to the pre-paste position. Before this circuit is broken by opening of the switch B–1, the segment of the ring 111 to which the switch A–1 is connected rides beneath the brush 122, so that the brake is held "on" by current flow through the closed contacts PD–2 and switches A–1. A resistor in series with the PD–2 contacts reduces the current flow and the braking force. This condition prevails in the zone between the lines IV and V (Fig. 1) but opening of the PD–2 contacts during this interval will release the brake. As explained below, the contacts PD–2 open when predriving is to begin; but in any event, the brake will be released by opening of the switch C–1 when the arm 91 passes the line VI after the splice is made. The spindle brake remains released as the reel is rotated to bring the new roll into the tension belts.

After the roll carried by the arm 91 has expired, the reel again rotates to advance the second new roll. When the arm 91 reaches the zone between the lines VII and VIII, the segment of the ring 111 which is connected to the switch D–1 falls beneath the brush 124, and the switch D–1 is closed. Thus, the brake 95 in the arm is energized as long as the contacts KLS–2 are closed. The latter contacts are closed in response to severing action of the knives, as explained below, thus automatically applying the magnetic brake to the expired roll, even though the associated toggle switch 131 might be open.

It will be understood that the mercury switches on the remaining arms 90 and 92, coacting with the slip rings 111 and 112 have their spindles braked in the same pattern as they are rotated through 360°.

*Auxiliary circuits*

It will be helpful first to consider the circuits in Figs. 19 through 22 which coact with components in the circuit of Fig. 18. Fig. 19 shows the circuit for energizing the reel motor 22 from a three phase voltage source through normally open contacts R–1, R–2, and R–3 which are closed in response to the energization of the reel contactor coil R shown in Fig. 18. This causes the reel to rotate in a counterclockwise direction as viewed in Fig. 2.

Fig. 20 illustrates schematically a circuit which cooperates with the speed controls for the press drive. Since these press drive controls are conventional, it will suffice to say only that the circuit 20 when completely closed between its terminals prevents an increase in the press speed. If the contacts PDX–2 are closed, or if both the POS–4 and D–3 contacts are closed the circuit is complete. As explained below, the contacts are controlled to prevent press speed increases during critical portions of the pasting cycle.

The circuit illustrated by Fig. 21, consisting of two relay contacts POS–6 and D–5 in series, also cooperates with the press drive speed controls. In a manner well known, this circuit when complete between its terminals causes the speed controls of the press to set the press speed at a certain maximum value. Thus, as explained below, whenever the pasting cycle is begun the press is automatically set to a predetermined maximum speed if the press has been running above that speed. However, the circuit shown by Fig. 21 has no effect on the ability of an operator to either decrease the press speed or stop the press entirely if conditions so require.

Fig. 22 shows still another auxiliary circuit connected in combination with the press speed controls. Of the latter, there is illustrated a "red button" stop switch having normally open contacts RBS–1 in series with a Stop solenoid across voltage supply lines. Second normally open contacts RBS–2 are connected in series with the coil of a relay RR–1 across the voltage lines so that this relay is picked up whenever a "red button" stop is made. Connected in parallel with the Stop solenoid are normally closed relay contacts D–6 in series with the coil of a relay RR–2. As long as the contacts D–6 are closed the coil RR–2 is also energized when the "red button" stop switch is depressed.

Normally open contacts PC–1 and PC–2 in the press controls shunt the "red button" contacts RBS–1 and RBS–2. These PC contacts close when the Stop solenoid is energized and open again only when the press comes to a standstill. Thus, the Stop solenoid and the relays RR–1 and RR–2 are both sealed in until the press stops once the emergency "red button" switch is closed.

When the press speed is to be decreased, a "decrease speed" switch is depressed. It has normally open contacts DS–1 in parallel with the contacts RBS–2 so that the relay coil RR–1 is energized as a result. It also has normally open contacts DS–2 in series across voltage lines with a "decrease" solenoid which, when energized, causes the press to slow down.

It is believed that both the connections and the operation of the control circuit illustrated by Fig. 18 may be described at one time. Accordingly, Fig. 18 will be described somewhat in the sequence of operation for the various components.

*Positioning the reel, predrive carriage and paster carriage*

Any time that a paste or splicing cycle is not in progress, the contactor coil R may be energized by depressing a manual push button switch M, thus closing the contacts R–1, R–2, R–3 and energizing the reel motor 22. At all times that a paper roll does not interrupt the light beam shining into the photoelectric relay 135, its coil PE is energized and the contacts PE–1 are closed.

To initiate the splicing operation, an operator depresses and holds a "position" push button switch, thus energizing the contactor coil R through normally closed contacts 1CLS–1 and PE–1. The reel, therefore, begins rotating in a counterclockwise direction, advancing the new roll 26 (Fig. 2) toward its pre-paste position. The lower contact for the "position" button energizes the coil of a relay POS so that it is picked up. The solenoid 71 for the paster carriage control 70 is not, however, energized because the contacts R–4 are at this time open. The operator must hold the "position switch" down until the periphery of the new roll 26 breaks the light beam, thereby deenergizing the coil PE and opening the contacts PE–1. This, in turn, deenergizes the coil R and the motor 22 to halt the reel with the new roll closely spaced to the running web W.

When the contactor R drops out, its contacts R–4 reclose, thereby energizing the solenoid 71 for the paster carriage four-way valve 70. As explained previously, the paster carriage thus begins to descend under the influence of gravity by bleed through the valve 401 (giving the latch hook 385 time to swing clear) until the limit switch 1CLS is actuated. As this occurs, contacts 1CLS–3 close to energize the solenoids 74, 75 for the safety valves 72, 73 through the now closed POS–2 and POS–3 contacts. Closure of the contacts 1CLS–3 also energizes the solenoid 56 for the four-way valve 55 controlling the predrive carriage 52. As a result, the predrive carriage 52 and the paster carriage both begin to descend toward their operative positions under the influence of their respective fluid pressure actuators 54 and 69. The predrive belt 58 thus rests on the surface of the new roll 26 and the paster carriage assumes a substantially vertical position adjacent the opposite side of the running web W.

As the paster carriage approaches its lowered or operative position, the mercury limit switch 2CLS is actuated. Upon closure of the normally open contacts 2CLS–2A, the coil for the POS relay is sealed in through the line which contains the normally closed CSS–1 contacts, a "reset" push button switch, RR2–1 contacts, RLS–4 contacts and RLS–3 contacts in parallel with PLS–1 contacts. The contacts 2CLS–3A close to prepare a circuit including a normally open "predrive" push button switch. Also, the contacts 2CLS–3B open to render inoperative the manual push button switch M.

The operator may now release the "position" switch since the POS relay is sealed in. Prior to the actuation of the carriage limit switch 2CLS, if the "position" button had been released, the predrive and paster carriages would have returned to their original positions. Therefore, if anything goes wrong during this initial stage of the operational sequence, the operator need only release the "position" button in order to restore the apparatus to its inoperative condition.

It is also to be noted that when the "position" button was first pressed and the POS relay energized, the contacts POS–6 in Fig. 21 closed to complete that auxiliary circuit, thereby causing the press speed to be set at a predetermined value slow enough to assure proper pasting operation, in the event that the press was operating at a faster speed. Simultaneous closing of the normally open POS–5 contacts in Fig. 20 completed that auxiliary circuit, thus rendering the press speed control means unable to increase the speed of the press beyond the value preset by the circuit in Fig. 21. However, it still is possible to decrease the press speed or stop the press.

While the reel was rotating to bring the new roll 26 into its pre-paste position the various mercury switches A–0, B–0, D–2, etc. were being closed and opened to energize and deenergize the spindle brake coils 95 through the slip ring 112, through the PD–2 contacts, or through the KLS–2 contacts according to the angular zone of the particular reel arm and the condition of those contacts. As noted above, the brake coil on a given spider arm is energized to lock the spindle 94 when the arm is in a position to receive a newly loaded roll. Then, just before predriving, as explained below, the contacts PD–2 open to release the new roll brake. Subsequent to the splice, as the reel is rotated the mercury switches in the arm carrying the expiring roll close to permit the completion of a circuit to the corresponding brake winding so that the expired roll is stopped before its tail can follow the new web into the press or pile up on the floor.

*Predriving*

After the new roll 26 is in its pre-paste position, the operator momentarily presses and closes the "predrive" switch, thus completing a circuit through the now closed contacts 2CLS–3A and the normally closed contacts RLS–2 for the coil of a relay PD. A second relay PDX, connected in parallel with the coil PD through normally closed contacts RLS–1, is also energized. These are sealed in through the POS–2 contacts by closure of contacts PD–1. Simultaneously, another auxiliary relay PDS is energized through the normally closed contacts PDSX–2 and sealed in through the contacts PD–1.

Energization of the coil PD opens the contacts PD–2 in series with the brush 122 riding on the slip ring 111. This breaks the circuit for the magnetic brake winding 95 of the spindle supporting the new roll so that the latter may now be driven by the predrive belt.

Referring now to Fig. 8, it will be seen that pick-up of the auxiliary relays PD, PDX and PDS, results in the closure of the contacts PDS–2 and PD–3, as well as opening of the contacts PDS–3. The control grid 182 of the vacuum tube 184 thus receives a high positive potential from the press tachometer 170 so that, as explained above, the amplidyne armature produces a relatively great voltage which causes the predrive motor to accelerate. The motor reaches and is automatically controlled at a speed such that the peripheral of the new roll 26 matches the speed of the running web W. The operator observes the ammeter 175 which will give an indication of changing current as the motor 59 accelerates. However, as the motor 59 levels out at the controlled speed, the ammeter reading will be constant. The operator then knows that the peripheral speed of the new roll 26 is proper for the pasting or splicing operation.

Returning to Fig. 18, it will be seen that pick-up of the relays PD, PDX and PDS also results in the energization of signal lights PF and PY which are connected in parallel with the coils PD and PDS. These signal lights may be located at the folder of the press and at other appropriate locations to warn the various personnel that a splice is about to be made. Also, the circuit including a normally open "paste" push button switch is prepared by the closure of contacts PD–1. The contacts PD–4 close and seal in the solenoid 56 for the predrive carriage control valve 55 so that the carriage 52 remains in its lowered position even though the contacts PA–4 later open.

It is to be noted that if the "red button" stop switch in Fig. 22 were closed, the resultant energization of the coil for the relay RR–2 would open the contacts RR2–1, thereby unsealing the POS relay. Opening of the POS–2 contacts would deenergize all of the solenoids and relay coils so that the predrive and paster carriages would return to their original condition prior to the time that the "position" switch was closed. And with the energization of the Stop solenoid, the press control contacts PC–1 and PC–2 seal in that solenoid and the coil RR–1 until the press comes to a standstill.

*Pasting*

When the operator observes the reading on the ammeter 175 (Fig. 8) is steady, he then depresses the "paste" switch (Fig. 18). As a result, the coil for an auxiliary relay PA is energized and seals in through its own normally open contacts PA–1 and the already closed contacts POS–2. The contacts PA–2 close so that the coil of another relay E is energized the next time that the cam 99 (Fig. 2) on the new roll spindle 94 closes its breaker points 98. The contacts PA–3 close so that a circuit to the contactor coil R will automatically be completed when the contacts 2CLS–2B reclose at the paster carriage retracts. Additionally, the resultant opening of the contacts PA–4 leaves the energization of the solenoid 56 for the predrive control valve energized solely through the contacts POS–2 and PD–4.

When the new roll breaker points 98 first close, they complete a circuit through the slip ring 112 and the segmented slip ring 114 to the relay coil E. Pick-up of this relay and closure of the contacts E–1 energizes the coil of another control relay D. The brush latch-releasing solenoid 329 is isolated, however, by opening of the contacts E–2. The energization of the coil D completes a sealing circuit through the contacts D–1. The contacts D–2 in parallel with the contacts 2CLS–2A close to complete the seal-in circuit for the POS coil even though the contacts 2CLS–2A subsequently open. Also, when the coil D is energized and sealed in, the contacts D–3 (Fig. 8) leading from the potentiometer 205 to the control grid 252 open, but the connection remains complete through the now closed contacts PDX–1.

The normally closed contacts D–4 in the circuit shown by Fig. 20 open also at this time, but the circuit remains complete through the now closed contacts PDX–2 so that the press speed cannot yet be increased. The contacts D–5 in the preset press speed circuit shown by Fig. 21, however, open and break that circuit so that changes in press speed may be made. At the same time, the contacts D–6 in the circuit shown by Fig. 22 open to prevent energization of the coil RR–2 in the event of a "red button" press stop. If such a stop is made at this time the paster control circuit is not reset because the splice may actually be completed while the press is coasting.

The foregoing all happens simultaneously when the relay D is picked up. As the new roll rotates sufficiently to make its corresponding breaker points 98 re-open, the coil E is deenergized so that the contacts E–2 reclose and supply current to the brush release solenoid 329 through the now closed contacts D–1. As a result, the bell crank (Fig. 10) is rocked clear of the latch cam 325, and the brushes are released to deflect the running web W and hold it against the new roll 26. At this time, the adhesive strip on the new roll has just passed the point of web contact, so that it adheres to the web after the new roll makes approximately one revolution.

With the release of the brush shaft 306, the limit switch BLS is actuated. Its contacts BLS–1 and BLS–2 close so that the coil of an auxiliary relay PDSX and the knife solenoid 335 will be energized the next time that the contacts E–4 close.

Then, upon continued rotation of the new roll spindle its breaker points 98 reclose to reenergize the coil for the relay E. The contacts E–4 close and energize the knife solenoid 335 which rocks the bell crank 332 (Fig. 10) free of the latch cam 331 so that the knives spring into the old web beneath the splice and sever it from the expiring roll. Closure of the contacts E–4 also energizes the coil PDSX which is sealed in through its contacts PDSX–3. The PDSX–1 contacts open to deenergize the solenoid 71 for the paster carriage control valve 70, so that the paster carriage immediately begins to retract.

Rotation of the knife shaft 308 also actuates the limit switch KLS so that its contacts KLS–1 close to complete a circuit through the brush 124 and a particular one of the segments in the slip ring 111, as well as through prepared mercury switches to energize the magnetic brake operative on the spindle supporting the expired roll. The latter is thus quickly stopped before the severed old web can unwind.

With the energization of the coil PDSX, its contacts PDSX–2 opened to deenergize the relay coil PDS. Also, the contacts PDSX–4 closed to seal in the coil E through the now closed contacts PA–2.

In the circuit shown by Fig. 8, the PDS–2 and PDS–3 contacts respectively open and close, thereby disconnecting the tachometers 170 and 154 and connecting the motor 59 in circuit with the control electrode 82 so that automatic regenerative braking of the motor 59 takes place for transition tension, as described above.

As the paster carriage retracts slightly, the limit switch 2CLS de-actuates, thereby reclosing its contacts 2CLS–2B which then energize the contactor coil R through the now closed contacts PA–3. As a result, the motor 22 is energized and the reel rotates to advance the new roll toward the tension belts 30. It will be noted that even though the contacts 2CLS–2A reopen, the POS coil remains sealed in through the now closed contacts D–2.

Also, as the paster carriage retracts slightly, the contacts 2CLS–4A reclose to establish an alternate seal-in circuit for the coil E, holding the latter energized even when the contacts PDSX–4 subsequently open.

Should any foreign object, such for example, as a workman, be disposed in the retraction path of the paster carriage, it will be struck by and pivot the safety deflector 340, thus actuating the switch CSS. The contacts CSS–1 open to drop out the POS relay which, in turn, opens its contacts POS–1 to drop out the contactor R. Reel rotation thus stops. The POS–2 contacts open to deenergize the safety solenoids 74, 75, closing the safety valves 72, 73 and trapping fluid in the cylinder 69 to halt carriage retraction. The foreign object may be freed from the deflector by closing the "position" switch, which as explained before, picks up the POS relay and energizes the solenoids 71, 74 and 75 so that the predrive carriage is lowered.

When the paster carriage reaches its substantially fully retracted position, the limit switch 1CLS de-actuates. Its contacts 1CLS–3 open to deenergize the safety solenoids 74, 75 so that the corresponding safety valves 72 and 73 reclose to trap the paster carriage in its retracted position. The latch hook 385 is automatically retracted beneath the pin 388 as shown in Fig. 14.

As the new roll makes contact with the tension belts 30, the reel limit switch RLS–1 is actuated by its cam 121 (Fig. 2*a*). Its normally closed contacts (Fig. 18) thus open to deenergize the relay PDX. As a result, the contacts PDX–1 in Fig. 8 open, completely disconnecting the control grid 252 from either the potentiometer 270 or 205. The capacitor 271 thus begins to discharge, as explained before, slowly reducing the negative potential on the control grid and causing the regenerative braking of the motor 59 to decay exponentially as the new roll moves into the tension belts.

With the deenergization of the coil PDX, the contacts PDX–2 also open to interrupt the circuit shown by Fig. 20. Thus, the press speed may now be increased if it is desired to do so.

As the reel continues to rotate, the reel limit switch RLS–2 next is opened by its cam when the new roll is in good contact with the belts 30.

The contacts RLS–2 deenergize the relay coil PD. Drop-out of this relay opens the contacts PD–4, deenergizing the solenoid 56 for the valve 55 so that the predrive carriage begins to retract. When the predrive carriage is fully retracted, the contacts PLS–1, which were open, reclose. Drop-out of the contacts PD–1 deenergizes the knife solenoid 335 and the relay PDSX.

As the reel rotates still further, the reel limit switch RLS–3 next is opened by its cam. However, if the contacts PLS–1 have not at this time reclosed, the POS coil is deenergized, opening the contacts POS–2 to thereby deenergize the coil PA which, in turn, opens the contacts PA–3 to drop-out the contactor R and stop reel rotation. By this safety feature, therefore, the predrive carriage must be fully retracted by the time the reel rotates sufficiently to open the switch RLS–3; otherwise, the reel is halted. It is thus impossible for the newly loaded roll to strike the predrive carriage as the reel advances, with possible damage to the apparatus.

Finally, as the newly spliced roll reaches a normal operating position in the belts 30, the reel limit switch RLS–4 opens. The holding circuit for the coil POS is then broken, its contacts POS–2 open and all solenoids and relay coils are deenergized. The paste cycle is thus complete with the running web W being drawn from the new roll, with the expired roll in position for removal and replacement by a newly loaded roll, and with the previously newly loaded roll ready to advance into the prepaste position when the next splice is to be made.

It will be noted from the foregoing description that the paste cycle may be interrupted at any time prior to seal-in of the POS relay by simply releasing the "position" push button switch. After the POS relay is sealed in, the cycle may be interrupted by depressing the normally closed "reset" push button. The actuation of the reset button unseals the POS relay to deenergize all electrical components, returning the paster carriage and predrive carriage to their retracted positions and deenergizing the predrive motor 59.

Referring to Fig. 22, a "red button" stop any time before seal-in of the relay D, and opening of the contacts D–6, will energize the coil RR–2, open the normally closed contacts RR2–1 and produce the same result as if the "reset" push button had been depressed. However, once the relay D has sealed-in, the "red button" stop does not have this effect since the splice may be completed as the press coasts.

It will be also noted from Fig. 22 that when a "red button" stop is made or the "decrease press" push button switch actuated, the relay coil RR–1 is enregized. Thus, the contacts RR1*a–d* in Fig. 8 would be actuated to disconnect the potentiometer 205 from and reconnect the potentiometer 270 to the control grid 252. As explained before, this changes the bias on the control grid 252 so that the braking current through the motor 59 is changed to a value determined by the setting of the potentiometer 270.

With the foregoing description of the organization and controlled operation of the improved web splicing apparatus, it will be apparent that the apparatus embodying the invention not only is substantially fully automatic but is also self-protecting and operates to produce smooth web splicing with minimum chances of web breakage.

We claim:

1. In apparatus for splicing a running web to a new web roll, the combination comprising, a rotatable reel having radial arms for supporting an expiring web roll from which the running web is drawn and for suporting the new roll, stationary belts frictionally engaging the expiring rolls, means for automatically regulating tension in said belts to maintain a predetermined tension in the running web, a predrive carriage including an endless belt engageable with the surface of the new roll, a direct current motor for driving said belt, two speed sensing means for providing electric signals responsive respectively to the speed of the running web and of said motor, an amplidyne connected in series with said motor, control means responsive to said signals for controlling the voltage of said amplidyne and thus the speed of said motor so that the running web speed and the new roll peripheral speed are substantially equal before splicing, a paster carriage including brush means for deflecting the running web against the new roll and knife means for severing the web from the expiring roll, means responsive to actuation of said knife means for rotating said reel to move the new roll toward said stationary belts, means for creating a reference signal proportional to the predetermined tension maintained in the running web, means responsive to the actuation of said knife means for causing said amplidyne to buck said motor to regeneratively brake said motor, said control means including means responsive to said reference signal for varying the bucking voltage at said amplidyne to maintain the motor current constant and the braking force of said motor at a value to cause said predetermined tension in the new roll web as the new roll advances toward said stationary belts.

2. In apparatus for splicing a running web to a new web roll, the combination comprising, a rotatable reel having radial arms for supporting an expiring web roll from which the running web is drawn and for supporting the new roll, stationary belts frictionally engaging the expiring roll, means for automatically regulating tension in said belts to maintain a predetermined tension in the running web, a predrive carriage including an endless belt engageable with the surface of the new roll, a motor for driving said belt, two speed sensing means for providing electric signals responsive respectively to the speed of the running web and of said motor, electric control means responsive to said signals for controlling said motor so that the running web speed and the new roll peripheral speed are substantially equal before splicing, a paster carriage including brush means for deflecting the running web against the new roll and knife means for severing the web from the expiring roll, means responsive to actuation of said knife means for rotating said reel to move the new roll toward said stationary belts, means for creating a reference signal proportional to the predetermined tension maintained in the running web, means responsive to the actuation of said knife means for causing said electric control means to regeneratively brake said motor, said control means including means responsive to said reference signal for maintaining the braking force of said motor at a value to cause said predetermined tension in the new roll web as the new roll advances toward said stationary belts.

3. In apparatus for splicing a running web to a new web roll, the combination of a direct current electric motor, means drivingly coupling said motor to the new roll, an amplidyne connected in series with said motor to energize the same, control means for said amplidyne to cause the peripheral speed of the new roll to substantially match the speed of the running web before the splice is made, brush means for deflecting the running web against an adhesive-coated leading edge of the new roll web, knife means for thereafter severing the running web, and means responsive to actuation of said knife means to cause said amplidyne to regeneratively brake said motor, said control means including means for automatically adjusting the amplidyne voltage to maintain the motor current constant so that the tension in the web drawn from the new roll is maintained at a predetermined value.

4. In apparatus for splicing a running web to a new web roll, the combination of a direct current electric motor, means drivingly coupling said motor to the new roll, electric control means for said motor to cause the peripheral speed of the new roll to substantially match the speed of the running web before the splice is made, brush means for deflecting the running web against an adhesive-coated leading edge of the new roll web, knife means for thereafter severing the running web, and means responsive to actuation of said knife means to cause said control means to regeneratively brake said motor, said control means including means for maintaining a predetermined braking current through said motor to keep the braking torque constant and hold the resulting tension in the web drawn from the new roll at a predetermined value.

5. In apparatus for splicing a web running into a printing press to a new web roll, the combination comprising a predrive carriage including an endless belt movable into peripheral contact with the new roll, a direct current motor for driving said belt and rotating the roll, two tachometers driven respectively by said motor and by a rotating part of the press, an amplidyne connected to energize said motor, and a control circuit responsive to the difference of the signals from said tachometers for controlling the voltage generated by said amplidyne to thus maintain the peripheral speed of the new roll substantially equal to the running web speed.

6. In apparatus for splicing a running web drawn from an expiring roll to a new web roll, the combination of stationary belts engaged with the expiring roll to tension the running web, means for moving the new roll into engagement with said belts after the splice is made, a direct current motor energized by an amplidyne for drivingly rotating the new roll so that its peripheral speed substantially matches the speed of the running web before the splice is made, means for terminating such drive after the splice is made, means for regeneratively breaking the new roll as it moves toward said belts immediately after the splice is made to tension the new web, said last-named means including means for controlling the voltage of the amplidyne which bucks the generated motor voltage to maintain the motor current and its braking torque substantially constant at a predetermined value.

7. In apparatus for splicing a running web to a new web roll, the combination of means for drivingly rotating the new roll so that its peripheral speed substantially matches the speed of the running web before the splice is made, means for terminating such drive after the splice is made, a direct current motor driven as a generator by the new roll immediately after the splice is made, an amplidyne in series with said motor and supplying a voltage bucking the motor voltage, and means for controlling said amplidyne voltage to maintain the current through said motor at a predetermined value, and thus to maintain the new web tension substantially constant.

8. In apparatus for splicing a running web to a new web roll, the combination of a direct current motor having an armature for drivingly rotating the new roll so that its peripheral speed substantially matches the speed of the running web before the splice is made, means for terminating such drive after the splice is made, means for regeneratively braking said motor immediately after the splice is made to tension the new web by applying a bucking voltage to said motor armature while the latter is being driven from said new roll, and means for controlling said last-named means to adjust said bucking voltage to maintain the current flow through said motor armature at a predetermined value, and thus keep the new web tension substantially constant in spite of changes in the speed of the running web.

9. In apparatus for splicing a running web drawn from an expiring roll to a new web roll, the combination of a movable support for the two rolls, tension belts frictionally engaged with the expiring roll to create tension in the running web, control means operative on said belts to maintain a predetermined tension in the web, means including a manually rotatable knob for varying said predetermined tension, a potentiometer having a movable part coupled to said knob for providing a voltage related to said tension, a paster carriage including means for deflecting said running web against adhesive on the new roll and means for severing the expiring roll web, means responsive to such severing for moving the new roll toward engagement with said tension belts, means responsive to such severing for transitionally braking the new roll, and means responsive to said voltage for controlling said braking means to maintain the transition tension substantially equal to said predetermined tension.

10. In apparatus for splicing a running web drawn from an expiring roll to a new web roll, the combination of a movable support for the two rolls, tension belts frictionally engaged with the expiring roll to create tension in the running web, control means operative on said belts to maintain a predetermined tension in the web, manually adjustable means for varying said predetermined tension, an adjustable electrical component mechanically ganged to said manual adjusting means for providing a reference signal related to said predetermined tension, a paster carriage including means for deflecting said running web against adhesive on the new roll and means for severing the expiring roll web, means responsive to such severing for moving the new roll toward engagement with said tension belts, means responsive to such severing for transitionally braking the new roll, and means responsive to said reference signal for controlling said braking means to maintain the transition tension substantially equal to said predetermined tension.

11. In apparatus for splicing a running web drawn from an expiring roll to a new web roll, the combination comprising movable means for supporting the rolls, tension belts frictionally engaging the expiring roll to create tension in the running web, fluid pressure means for automatically maintaining a predetermined tension in said belts, a manually adjustable pressure regulator for said fluid pressure means to adjust the web tension so maintained, a paster carriage including means for deflecting the running web against the new roll and means for severing the expiring roll web, means responsive to actuation of said severing means for moving the new roll into operative engagement with said tension belts, transition tension braking means operative on said new roll, a pressure potentiometer including a bellows receiving the pressure provided by said regulator and a resistor wiper moved by said bellows to provide a voltage proportional to said predetermined tension, and a control responsive to said voltage for controlling said braking means to make the transition tension substantially equal to said predetermined tension.

12. In apparatus for splicing a running web drawn from an expiring roll to a new web roll, the combination comprising movable means for supporting the rolls, tension belts frictionally engaging the expiring roll to create tension in the running web, fluid pressure means for automatically maintaining a predetermined tension in said belts, a manually adjustable pressure regulator for said fluid pressure means to adjust the web tension so maintained, a paster carriage including means for deflecting the running web against the now roll and means for severing the expiring roll web, means responsive to actuation of said severing means for moving the new roll into operative engagement with said tension belts, transition tension braking means operative on said new roll in response to actuation of said severing means, a pressure potentiometer for producing a reference signal proportional to the pressure provided by said regulator, and control means for said braking means responsive to said electrical signal for maintaining the transition tension substantially equal to said predetermined tension when said adjusting means are reset.

13. In apparatus for splicing a running web drawn from an expiring roll to a new web roll, the combination comprising movable means for supporting the rolls, tension belts frictionally engaging the expiring roll to create tension in the running web, fluid pressure means for automatically maintaining a predetermined tension in said belts, a manually adjustable pressure regulator for said fluid pressure means to adjust the web tension so maintained, a paster carriage including means for deflecting the running web against the new roll and means for severing the expiring roll web, means responsive to actuation of said severing means for moving the new roll into operative engagement with said tension belts, transition tension braking means operative on said new roll in response to actuation of said severing means, an electrical element for producing a reference signal proportional to the pressure provided by said regulator, and control means for said braking means responsive to said electrical signal for maintaining the transition tension substantially equal to said predetermined tension regardless of the setting of said adjustment means.

14. In apparatus for splicing a running web drawn from an expiring roll to a new web roll, the combination comprising friction belts operative on the expiring roll, means for automatically controlling said belts to create a predetermined tension in the running web, adjustment means for varying the predetermined tension; means for splicing the running web to the new roll web and for severing the expiring roll web, means for moving the new roll into operative engagement with said belts after such severing, transition tension braking means operative on said new roll after such severing and as it moves toward said belts, means for producing a reference signal proportional to the setting of said adjustment means, and a control responsive to said reference signal for controlling said transition tension braking means to maintain the transition tension substantially equal to said predetermined tension.

15. In apparatus for splicing a running web drawn from an expiring roll to a new web roll, the combination comprising means operative on the expiring roll to create a predetermined running tension in the running web, means for adjusting said predetermined tension, a paster carriage including means for deflecting the running web against the new roll and means for severing the expiring roll web, means for moving the new roll into operative relation with said running tension-creating means after such severing, transition tension braking means operative on said new roll as it moves toward said belts, means for producing a reference signal proportional to the setting of said adjusting means, and control means responsive to said reference signal for controlling said transition tension braking means to maintain the transition tension substantially equal to said predetermined tension.

16. In apparatus for splicing a running web drawn from an expiring roll to a new web roll, the combination comprising retarding means operative on the expiring roll to create an adjustable predetermined tension in the running web, means for deflecting the running web against the new roll and means for severing the expiring roll web, means for moving the new roll into operative engagement with said retarding means after such severing, braking means operative on said new roll as it moves toward said retarding means, means for producing a reference signal proportional to said predetermined tension, and means responsive to said reference signal for controlling said braking means to maintain said predetermined tension in the new roll web.

17. In apparatus for splicing a running web drawn from an expiring roll to a new web roll having adhesive on its leading edge, the combination comprising a rotatable reel having radial arms for supporting the rolls, stationary tension belts frictionally engaging the expiring roll, an electric motor drivingly coupled to the new roll, means including an amplidyne for energizing said motor with a controlled voltage so that the peripheral speed of the new roll substantially matches the running web speed, a paster carriage including means for deflecting the running web against the adhesive on the new roll and means for severing the expiring roll web, means responsive to such severing for rotating said reel to advance the new roll toward engagement with said tension belts, means responsive to such severing for bucking the amplidyne voltage against the motor voltage to regeneratively brake the motor and new roll as the latter advances, means responsive to a control signal for regulating the voltage of said amplidyne, and a charged resistance-capacitance circuit for providing said signal together with means for discharging the same when the reel reaches a predetermined position so that the signal decays and progressively increases the amplidyne voltage to reduce the braking torque of said motor as the new roll engages said tension belts.

18. In apparatus for splicing a running web drawn from an expiring roll to a new web roll having adhesive on its leading edge, the combination comprising a rotatable reel having radial arms for supporting the rolls, stationary tension belts frictionally engaging the expiring roll, an electric motor rotationally driving the new roll so that its peripheral speed substantially matches the running web speed, a paster carriage including means for deflecting the running web against the adhesive on the new roll and means for severing the expiring roll web, means responsive to such severing for rotating said reel to advance the new roll toward engagement with said tension belts, means responsive to such severing for regeneratively braking said motor to brake the new roll and create transition tension in the web as it advances, control means for regulating the current of the motor and its braking torque in accordance with an electric signal and independently of the motor speed, and a charged resistance-capacitance circuit for providing said signal together with means for discharging the same when the reel reaches a predetermined position so that the signal decays and progressively reduces the force of said braking means as the new roll engages said tension belts.

19. In apparatus for splicing a running web drawn from an expiring roll to a new web roll having adhesive on its leading edge, the combination comprising a rotatable reel having radial arms for supporting the rolls, stationary tension belts frictionally engaging the expiring roll, means for rotationally driving the new roll so that its peripheral speed substantially matches the running web speed, a paster carriage including means for deflecting the running web against the adhesive on the new roll and means for severing the expiring roll web, means responsive to such severing for rotating said reel to advance the new roll toward engagement with said tension belts, electric means for braking the new roll as it advances, control means for regulating the force of said braking means in accordance with an electric signal, and a charged resistance-capacitance circuit for providing said signal together with means for discharging the same when the reel reaches a predetermined position so that the signal decays and progressively reduces the force of said braking means as the new roll engages said tension belts.

20. In apparatus for splicing a running web drawn from an expiring roll to a new web roll, the combination of a rotatable reel having radial arms for supporting the rolls, stationary tension belts frictionally engaged with the expiring roll to create tension in the running web, a paster carriage including means for deflecting the running web against the new roll and means for severing the expiring roll web, motor means responsive to such severing for rotating said reel to advance the new roll toward engagement with said tension belts, an electric motor drivingly connected to the new roll, means for regeneratively braking said motor to brake the new roll as it advances and create transition tension in the new web, means for controlling said regenerative braking means in accordance with an electric signal, and means operative as the reel reaches a predetermined rotational position for causing said electric signal and the braking torque of said motor to smoothly decay as the new roll engages said belts.

21. In apparatus for splicing a running web drawn from an expiring roll to a new web roll, the combination of a rotatable reel having radial arms for supporting the rolls, stationary tension belts frictionally engaged with the expiring roll to create tension in the running web, a paster carriage including means for deflecting the running web against the new roll and means for severing the expiring roll web, motor means responsive to such severing for rotating said reel to advance the new roll toward engagement with said tension belts, electric means responsive to such severing for applying a predetermined braking force to the new roll as it advances to create transition tension in the new web, means for controlling said braking means in accordance with an electric signal, and means operative as the reel reaches a predetermined rotational position for causing said electric signal to smoothly decay and thus reduce the force of said braking means as the new roll engages said belts.

22. In apparatus for splicing a running web drawn from an expiring roll to a new web roll, the combination comprising movable means for rotatably supporting the rolls, substantially stationary retarding means engaged with the expiring roll to create tension in the running web, a paster carriage including means for deflecting the running web against adhesive on the new roll and means for severing the expiring roll web, means responsive to such severing for moving the new roll into operative engagement with said retarding means, a motor drivingly connected with said new roll, means for generating a controlled voltage bucking said motor to regeneratively brake the latter as said new roll moves toward said retarding means to create transition tension in the new roll web, and control means operative in response to the new roll reaching a predetermined position in proximity to said retarding means for causing said controlled voltage to gradually increase and thus to smoothly reduce the braking torque of said motor as the new roll engages said retarding means.

23. In apparatus for splicing a running web drawn from an expiring roll into a press to a new web roll, the press having controls for stopping and decreasing its speed, the combination of a rotatable reel having radial arms for supporting the rolls, tension belts frictionally engaged with the expiring roll before the splice, means for pasting the running web to the new roll web and severing the expiring roll web, means responsive to such severing for rotating said reel to advance the new roll into engagement with said tension belts, a direct current motor operatively connected through an endless belt with the new roll, means responsive to severing of the expiring roll web for regeneratively braking said motor, amplifying control means for opposing the voltage of said motor in accordance with a voltage signal, first and second potentiometers providing adjustable voltage signals, and means responsive to actuation of one of said press controls for switching said control means from the first to the second potentiometer to thereby change the regenerative braking force.

24. In apparatus for splicing a running web drawn from an expiring roll into a press to a new web roll, the press having controls for stopping and decreasing its speed, the combination of a rotatable reel having radial arms for supporting the rolls, tension belts frictionally engaged with the expiring roll before the splice, means for pasting the running web to the new roll web and severing the expiring roll web, means responsive to such severing for rotating said reel to advance the new roll into engagement with said tension belts, a motor operatively connected through an endless belt with the new roll, means responsive to severing of the expiring roll web for regeneratively braking said motor, control means for governing the regenerative braking torque of said motor in accordance with a preset electric signal, and means responsive to actuation of one of said press controls for increasing said signal to thereby increase the braking effort and prevent overrun of the new roll as the press slows down.

25. In apparatus for splicing a running web drawn from an expiring roll into a press to a new web roll, the press having controls for stopping the same or decreasing its speed, the combination comprising a movable support for the rolls, tension belts frictionally engaged with the expiring roll before the splice, means for moving said support to advance the new roll into said tension belts after the splice, electric means for braking the new roll during the transition period it moves toward said belts, means including a vacuum tube for controlling said braking means in accordance with an electric signal applied to the grid thereof, and switch means responsive to the actuation of one of said press controls to change said electric signal and thereby increase the braking action to prevent overrun of the new roll as the web slows down.

26. In apparatus for splicing a running web drawn from an expiring roll into a press to a new web roll, the press having controls for stopping the same or decreasing its speed, the combination comprising a movable support for the rolls, tension belts frictionally engaged with the expiring roll before the splice, means for moving said support to advance the new roll into said tension belts after the splice, electric means for braking the new roll during the transition period it moves toward said belts, means for controlling said braking means in accordance with an electric signal, and means responsive to the actuation of one of said press controls to modify said electric signal and thereby change the braking force on the new roll as the web slows down.

27. In apparatus for splicing a running web drawn from an expiring roll into a press to a new web roll, the press having controls for stopping it or decreasing its speed, the combination comprising stationary tension belts operative on the expiring roll to create tension in the running web, means for bringing the new roll into operative engagement with said belts after the splice is made, means for braking the new roll during the transition period between the splice and its engagement with said tension belts, means for controlling the force of said braking means at a selected value and means responsive to the actuation of one of the press controls to increase the force of said braking means and thus prevent overrun of the new roll if the web slows down before the new roll is engaged with said belts.

28. In apparatus for splicing a running web drawn from an expiring roll into a press to a new web roll, the press having controls for stopping it or decreasing its speed, the combination comprising retarding means operative on the expiring roll to create tension in the running web, means for bringing the new roll into operative engagement with said retarding means after the splice is made, means for braking the new roll during the transition period between the splice and its engagement with said retarding means, means for maintaining the force of said braking means at a selected value, and means responsive to the actuation of one of said press controls to change the force of said braking means as the web slows down.

References Cited in the file of this patent

UNITED STATES PATENTS

| | | |
|---|---|---|
| 1,738,083 | Tornberg | Dec. 3, 1929 |
| 2,065,001 | Wood | Dec. 22, 1936 |
| 2,129,618 | Horton | Sept. 6, 1938 |
| 2,140,528 | Horton | Dec. 20, 1938 |
| 2,147,617 | McCleery | Feb. 14, 1939 |
| 2,205,498 | Schwarz | June 25, 1940 |
| 2,311,626 | Cline | Feb. 23, 1943 |
| 2,334,164 | Lotz | Nov. 16, 1943 |
| 2,601,071 | Tollison | June 17, 1952 |
| 2,620,994 | Bennett | Dec. 9, 1952 |
| 2,725,507 | Greer | Nov. 29, 1955 |
| 2,765,989 | Pell | Oct. 9, 1956 |
| 2,777,964 | Di Mino | Jan. 15, 1957 |